(12) United States Patent
Haefner

(10) Patent No.: US 11,115,289 B1
(45) Date of Patent: Sep. 7, 2021

(54) SYSTEMS AND METHODS FOR NETWORK SECURITY MODEL

(71) Applicant: CABLE TELEVISION LABORATORIES, INC, Louisville, CO (US)

(72) Inventor: Kyle Haefner, Fort Collins, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 16/918,998

(22) Filed: Jul. 1, 2020

Related U.S. Application Data

(60) Provisional application No. 62/956,801, filed on Jan. 3, 2020, provisional application No. 62/854,385, filed on May 30, 2019.

(51) Int. Cl.
| | | |
|---|---|---|
| *G06F 15/16* | (2006.01) | |
| *H04L 12/24* | (2006.01) | |
| *H04L 29/06* | (2006.01) | |
| *H04L 12/851* | (2013.01) | |
| *G06N 7/00* | (2006.01) | |

(52) U.S. Cl.
CPC .......... *H04L 41/147* (2013.01); *G06N 7/005* (2013.01); *H04L 41/142* (2013.01); *H04L 47/2441* (2013.01); *H04L 63/1425* (2013.01)

(58) Field of Classification Search
CPC . H04L 41/147; H04L 41/142; H04L 47/2441; H04L 63/1425; G06N 7/005
See application file for complete search history.

(56) References Cited

U.S. PATENT DOCUMENTS

| | | | |
|---|---|---|---|
| 10,057,264 B1* | 8/2018 | ElNakib | H04L 63/102 |
| 2013/0042298 A1* | 2/2013 | Plaza Fonseca | H04L 41/12 726/1 |
| 2018/0025086 A1* | 1/2018 | Malkin | G06Q 30/02 707/710 |
| 2019/0036954 A1* | 1/2019 | Garcia | H04L 63/20 |
| 2019/0098028 A1* | 3/2019 | Ektare | G06F 21/577 |
| 2020/0314107 A1* | 10/2020 | Joshi | H04L 63/20 |

* cited by examiner

*Primary Examiner* — Hieu T Hoang
(74) *Attorney, Agent, or Firm* — Armstrong Teasdale LLP

(57) ABSTRACT

A security apparatus for a local network is in communication with an external electronic communication system and a first electronic device. The apparatus includes a memory device configured to store computer-executable instructions, and a processor in operable communication with the memory device. The processor is configured to implement the stored computer-executable instructions to cause the apparatus to determine a complexity score for the first electronic device, establish a behavioral pattern for the first electronic device operating within the local network, calculate a confidence metric for the first electronic device based on the determined complexity score and the established behavioral pattern, and control access of the first electronic device to the external electronic network according to the calculated confidence metric.

20 Claims, 19 Drawing Sheets

SYSTEMS AND METHODS FOR NETWORK SECURITY MODEL

CROSS REFERENCE TO RELATED APPLICATIONS

This application claims the benefit of and priority to U.S. Provisional Patent Application Ser. No. 62/854,385, filed May 30, 2019, and to U.S. Provisional Patent Application Ser. No. 62/956,801, filed Jan. 3, 2020, both of which are incorporated herein by reference in their entireties.

BACKGROUND

The field of the disclosure relates generally to management of computer networks, and more particularly, to security modeling within such networks.

Conventional electronic devices interact with a number of secure electronic networks and computer systems. Although many of these networks and systems are subject to significant security protections, the electronic devices that interact therewith may not be subject to the same levels of security. Conventionally, it is thus considered very important to be able to reliably determine the identity of such electronic devices in order to provision the devices for use within a particular network, system, or ecosystem. Many conventional provisioning techniques for electronic devices utilize a Public Key Infrastructure (PKI) to validate an electronic signature of the device in a variety of technology fields, such as telecommunications (e.g., mobile communication devices), the Internet of Things (IoT), online banking, secure email, and e-commerce.

Challenges to IoT Security

It is estimated that, over the next decade, the number of in service and operational IoT devices will reach 128 billion. Approximately sixty percent of these IoT devices are expected to be consumer devices, which generally are not subject to the same security protections of contexts. At present, the size of the IPv4 Internet is approximately 4.3 billion addresses. At this expected scale of over 100 billion IoT devices, a significantly detrimental botnet (i.e., a group of devices which have been infected by malware and have come under the control of a malicious actor) could be created by the existence of just one compromised device for every 200,000.

Securing the IoT depends on knowing what is on the network and is it vulnerable. Most conventional approaches have focused on: (1) determining what the IoT devices are—that is, Device Identity; and (2) determining what the IoT devices are doing—that is, Device Behavior. Identity and Behavior though, have become significantly complex with respect to the IoT.

For example, the Identity of an IoT light bulb was initially considered rather straightforward: the bulb was on, off, or dimmed. The IoT Identity of the light bulb became more complex as multicolored IoT light bulbs have been introduced. The IoT Identity complexity has increased even moreso as IoT light bulbs now play music, record video, sound alarms, and some now even function as "bug zappers." Identifying the IoT device as a "light bulb" is becoming less and less descriptive of the device as the device's behavior veers further and further away from merely providing a light source. This deviation between Identity and Behavior in the IoT device is a phenomenon known as "IoT Cognitive Dissonance." By attempting to use identity (e.g., "light bulb") to define the behavior of the device, much of the increasing functionality (e.g., music, video, motion sensing, alarm, etc.) being added to such devices is misidentified. IoT Cognitive Dissonance also occurs by attempting to use behavior to define identity. Video recording behavior in a light bulb, for example, will not easily identify the device as a "light bulb."

FIG. 1 is a graphical illustration of a device complexity scale 100. As may be seen from scale 100, the IoT Cognitive Dissonance increases according to the complexity of the device. That is, low complexity devices 102 (e.g., simple sensors, "basic" light bulbs, single-purpose devices, etc.) exhibit relatively low IoT Cognitive Dissonance in comparison with high-complexity devices 104 (e.g., general purpose electronic devices, computers, smartphones, tablets, etc.). The determination of where a particular device lands within scale 100 (i.e., between low complexity devices 102 and high-complexity devices 104) may provide a quantifiable measure of confidence to apply to a behavioral model (e.g., anomaly detection) for an IoT device such that the IoT Identity (e.g., IoT fingerprinting) of the device becomes relatively inconsequential. In this written description, the terms "confidence" and "trust" are used interchangeably for purposes of explanation, and not in a limiting sense.

Residential IoT

Residential IoT, also referred to as smart home technology, creates unique challenges for IoT security. Residential IoT, for example, typically includes a plurality of sensors, cameras, light bulbs, voice assistants, and more. All such devices conveniently enable a home residence to be programmable and interactive in ways previously impossible. The IoT in present day smart homes, for example, allows homeowners to change a thermostat, turn on/off lights, pre-heat ovens, and/or monitor a video feed of a sleeping infant, all from a smartphone up to thousands of miles away. The IoT changes the home from a relatively static place to a dynamic environment, reacting to and anticipating the needs of its inhabitants.

In the near future, smart home appliances will coordinate with each other to maximize efficiency by applying climate controls, lighting, etc. where and when such control is needed or desired. Residential IoT is enabling health care providers to monitor patients remotely, inexpensively, and over a longer duration than is possible in a physician office or health care facility. This functionality is leading to significant quality of life improvements, for example, of elderly populations living independently.

However, such capability improvements have come at a cost. In general, IoT devices are small computing nodes. Like a laptop or smartphone, IoT devices have a CPU, memory, storage, power source, and network connection. IoT devices though, are fundamentally more difficult to configure and secure for the non-expert homeowner. Unlike a laptop or smartphone, IoT devices are often embedded devices with no interactive screen or other meaningful user interface. The lack of such interface renders IoT devices more difficult to properly configure and join to the network. Many IoT devices thus frequently include default credentials to make it easy for the average homeowner to log in and connect (e.g., "plug-and-play").

With the potential for hundreds of devices on a typical home network (some forecasts predict that typical family home may include 500 connected devices or more), the average homeowner does not have the skills and resources to manage the scale and complexity required to securely configure and maintain a network of this size. A conventional smart home network is described further below with respect to FIG. 2.

FIG. 2 is a schematic illustration of a conventional flat home network 200. Network 200 includes a central router 202 in operable communication with Internet 204 and a plurality of electronic devices 206. Router 202 typically includes firewall functionality, and may be an access point (AP). Through router 202, however, conventional network 200 does not restrict devices 206 from having a first unrestricted line of access 208 to Internet 204. Having such relatively direct access to Internet 204 greatly increases exposure of network 200 to distributed denial-of-service (DDoS) attacks (e.g., a botnet), and risks propagation of infections from Internet 204 being propagated throughout network 200. In this conventional configuration, router 202 further allows a second unrestricted line of access 210 between individual devices 206, which further increases the ease of an infection propagating from one device 206 to another, as well as a coordinating attack pivoting from one device 206 within network 200 to a more valuable target device (e.g., from a smart TV to a laptop computer or a smart door lock).

Most conventional smart home flat networks are thus generally complacent about having a number of connected devices exposed to an Internet plagued with security problems. These static and flat home network architectures are no longer sufficient to scale and secure the ever-increasing more complex networks of developing technology and IoT devices. Additionally, IoT devices are often limited in processing capabilities, memory, storage, and power. Many of these devices do not run complex processes or operating systems and they cannot scan themselves for vulnerabilities or run anti-virus software.

Examples of IoT devices include medical sensors that monitor health metrics, home automation devices, traffic monitoring, and scientific research sensors. Some IoT devices are designed to be disposable, and last for as little as a few weeks (e.g., a sensor on food packaging). Other IoT devices are embedded into infrastructures that are intended to last for decades (e.g., sensors embedded into roads). Some IoT devices need to run on batteries for years, have limited processing and storage capabilities, and spend a majority of time in a sleep mode. Other IoT devices have powerful processors, constant power sources, and high bandwidth network connections. This diversity in function, capability, and life-span is at the core of what makes securing these devices so challenging.

Trust and security issues present many specific challenges to the cable network ecosystem as well. Cable network ecosystems often include separate wireless (e.g., base stations, transceivers, etc.) and wireline (e.g., coaxial cable, optical fiber cable (OFC), other physical transport media, etc.) portions owned and controlled by the same or different operators. Many cable network operators, such as Multiple System Operators (MSOs), use Data Over Cable Service Interface Specification (DOCSIS) networks for backhauling Internet traffic. The DOCSIS v3.1 standard specifies security protocols between a modem termination system (MTS, e.g., cable MTS (CMTS)) and a modem (e.g., cable modem, or CM) using PKI. Key objectives of the DOCSIS specifications are to (i) prevent theft of service, (ii) prevent injection of malicious software into the CM by ensuring the integrity of software downloads, and protecting the privacy of customers by providing link layer encryption from the CM to CMTS.

However, as the cable termination point becomes increasingly the gateway of choice for users to the Internet, serious concerns remain as to how to ensure that only trusted or trustworthy devices are allowed access to the cable infrastructure. Some coexistence standards with the cable ecosystem have emerged from the Open Connectivity Foundation (OCF) IoTivity and the Wi-Fi Alliance (WFA) Hotspot 2.0/Passpoint protocols. Nevertheless, gaps remain for securing the DOCSIS 3.1 security capabilities in the cable network infrastructure with the OCF IoTivity and WFA security.

Implementation of these types of IoT security is very costly for both homeowners and manufacturers. To properly secure a device, a manufacturer must expend significant costs for extra development cycles, extra time dedicated to testing, and potentially adding hardware just for security. Conventional IoT infrastructures employ hardware roots of trust that establish a tamper-resistant secure element (i.e., a "black box"), that uses built-in cryptographic keys to perform cryptographic operations, such as encryption, decryption, and hashing. Examples of such hardware roots of trust include Trusted Platform Modules (TPMs) and Hardware Security Modules (HSMs), which often utilize PKI. These trust models/schemes are used for remote attestation, with the attestation being typically performed by a third party and/or a Cloud services user.

PKI uses a pair of cryptographic keys (e.g., one public and one private) to encrypt and decrypt data. PKI enables devices to obtain and renew, for example, X.509 certificates, which establish trust between devices and communications encrypted using such protocols as Transport Layer Security (TLS). PKI includes policies and procedures for encrypting public keys, as well as the creation, management, distribution, usage, storage, and revocation of digital certificates. PKI binds the public keys to the identity of a person or legal entity, typically through a trusted Certificate Authority (CA). The PKI hierarchy identifies a chain of trust for a device or program, and may provide secure software download requirements for devices, and/or secure certificate injection requirements on device manufacturers. The CA, the electronic devices, the device manufacturers, and users of the device interact over a PKI ecosystem.

Conventional implementation of encryption and authentication in a device ecosystem though, requires (i) complex techniques of distributing symmetrical keys, or (ii) incorporation of a PKI model into the devices. Such additional complexity often generates significant costs and delays in a field where profit margins are slim, and where time-to-market is critical. Moreover, adding encryption to the device still further complicates the device interoperability and, if done improperly, may negatively affect the user experience, all of which create disincentives for manufactures to add such requisite security capabilities to the devices.

The lack of security prioritization in the design and manufacture of IoT devices has led to a glut of poorly secured devices on the market, which in turn has created a similarly increasing list of vulnerabilities linked to such IoT devices. In one recent case, a security flaw in one type of IoT light bulb enabled attackers to replace the bulb's firmware with a modified version that, once so compromised, was then able to issue the same attack on other vulnerable bulbs within range. If an adequate density of such vulnerable light bulbs were deployed, a security attack would be able to spread across a large within minutes. Such an attack is not only serious because it could control the ability to turn the bulbs on and off, but also because it would potentially be able to jam the 2.4 GHz spectrum, thereby causing all communications within this spectrum—including Wi-Fi—to fail. Additionally, such an attack at a city-wide scale would enable the attackers to coordinate how and when to turn compromised devices on and off, which could potentially destabilize the electrical grid.

Also of great concern, broader and more impactful attacks from compromised IoT devices have been propagating on the Internet in the form of DDoS attacks. Just recently, one botnet DDoS attack against a particular network took down hundreds of websites, and had a sustained and unprecedented attack bandwidth of up to 1.1 terabits per second (Tbs). At present, the advanced persistent threat of the botnet continues to embed itself in the Internet, and at least one new variant targets an additional 27 exploits of enterprise sign and video conference systems.

Security experts have for years been warning of dire consequences as companies and governments continue to turn a blind eye to the security of the IoT. Governments have not established sufficient regulations requiring more stringent cyber-security practices, and device manufactures selling vulnerable hardware are unlikely to face legal repercussions. Many manufacturers often rush to market with new IoT devices, but without spending the time and money necessary to test such devices for vulnerabilities. Additionally, many IoT devices are shipped with a default administrative user and a default password that is relatively easy for malicious actors to exploit.

Accordingly, there is a significant need to develop network architectures and processes that do more than simply carry traffic, but which are also aware of what such traffic is, from where the traffic came, and where the traffic is going. It is therefore desirable to develop networks capable of intelligently adapting to threats, and which may proactively protect themselves from attacks.

SUMMARY

In an embodiment, a security apparatus is provided for a local network. The apparatus is in communication with an external electronic communication system and a first electronic device. The apparatus includes a memory device configured to store computer-executable instructions, and a processor in operable communication with the memory device. The processor is configured to implement the stored computer-executable instructions to cause the apparatus to determine a complexity score for the first electronic device, establish a behavioral pattern for the first electronic device operating within the local network, calculate a confidence metric for the first electronic device based on the determined complexity score and the established behavioral pattern, and control access of the first electronic device to the external electronic network according to the calculated confidence metric.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
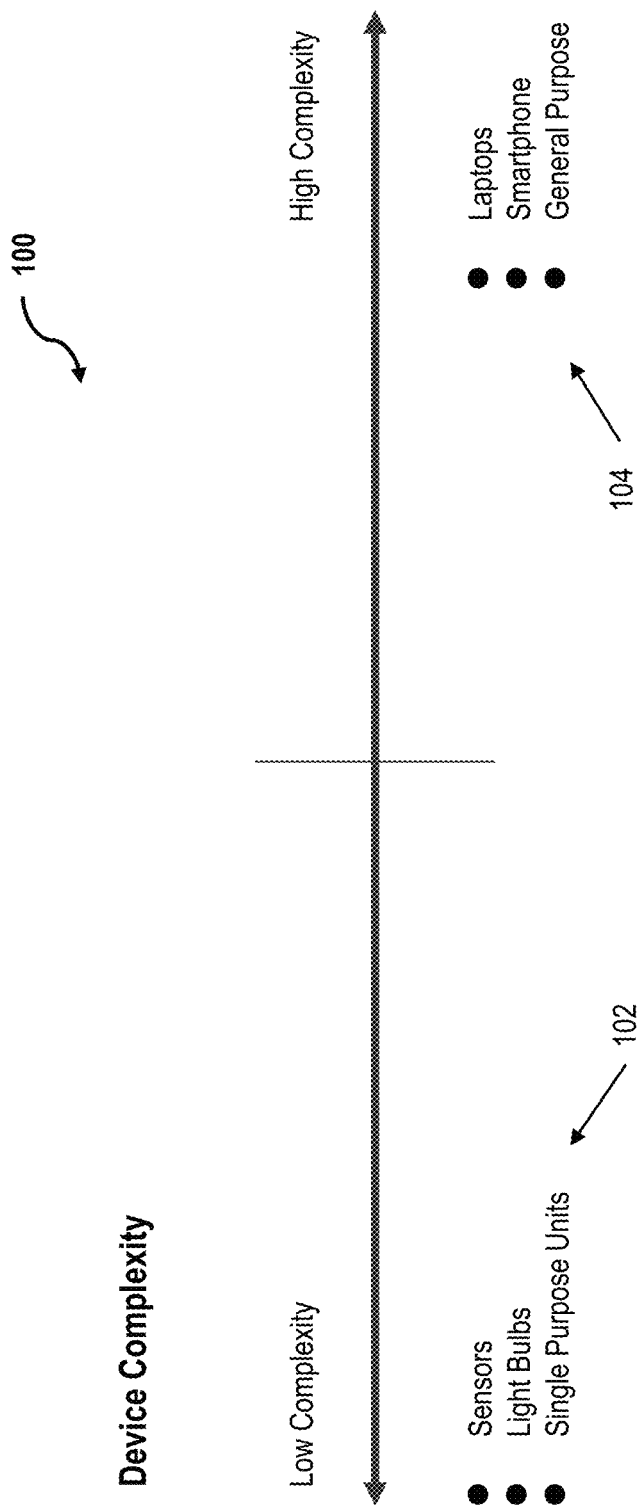
FIG. 1 is a graphical illustration of a device complexity scale.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged;

such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used further herein, "CA" may refer to a certificate authority hosting a root certificate, and may further include, without limitation, one or more of a CA computer system, a CA server, a CA webpage, and a CA web service.

As used herein, unless specified to the contrary, "modem termination system," or "MTS'" may refer to one or more of a CMTS, an optical network terminal (ONT), an optical line terminal (OLT), a network termination unit, a satellite termination unit, and/or other termination devices and systems. Similarly, "modem" may refer to one or more of a CM, an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The embodiments described herein provide innovative systems and methods for trust establishment, flow confidence, and network security for computer networks and the Internet of Things (IoT). The present embodiments introduce, among other solutions, methodologies for classifying IoT devices based on the complexity and variance of their network flows. In some embodiments, a behavioral model is created to establish a confidence metric for a device based on a normal flow boundary and a number of unique significant flows. A calculated device confidence score may then modify a learned behavioral boundary to score flows from each device. The present embodiments further provide an innovative reference architecture useful to dynamically make per-flow access control decisions for each device.

Whereas networks of the past were essentially made up of a relatively small number of general purpose machines, modern IoT networks increasingly are made up of a large number of specialized devices, each designed to do a single task. The single purpose, and often constrained nature, of such devices make it more difficult to intrinsically secure these devices, but also easier to extrinsically analyze. For example, a single temperature sensor is not conventionally able to run an anti-malware application, but nevertheless has a simple and predictable network traffic footprint.

The embodiments described herein advantageously exploit the single purpose nature of many IoT devices to derive several measures of complexity for these, as well as more complex, IoT devices. The present systems and methods further effectively establish a correlation between the complexity and the predictability of IoT devices to determine statistically significant techniques for measuring the complexity of a system to inform meaningful confidence in a predictive model of that system. In an exemplary embodiment, the relationship between predictive information and complexity is commutative; that is, the predictive information may be used to derive a measure of complexity, and the complexity may also provide an effective general measure of predictive information.

The present systems and methods further utilize innovative machine learning processes for the complexity-predictability relationship to build an anomaly-based behavioral model that accurately and efficiently determines the complexity of a device, which directly an amount of confidence in the model.

As described herein, the model, architectural, framework, and flow embodiments generally refer to one or more individual innovative embodiments, any or all of which may be implemented alone (i.e., independently of one another), or in any combination thereof. Some embodiments are described herein for illustration purposes, and not in a limiting sense, for example, within the context of a network supported by PKI. The person of ordinary skill in the art will understand though, after reading and comprehending the present disclosure, that the principles herein may be applied to network security more broadly.

Figure 2:
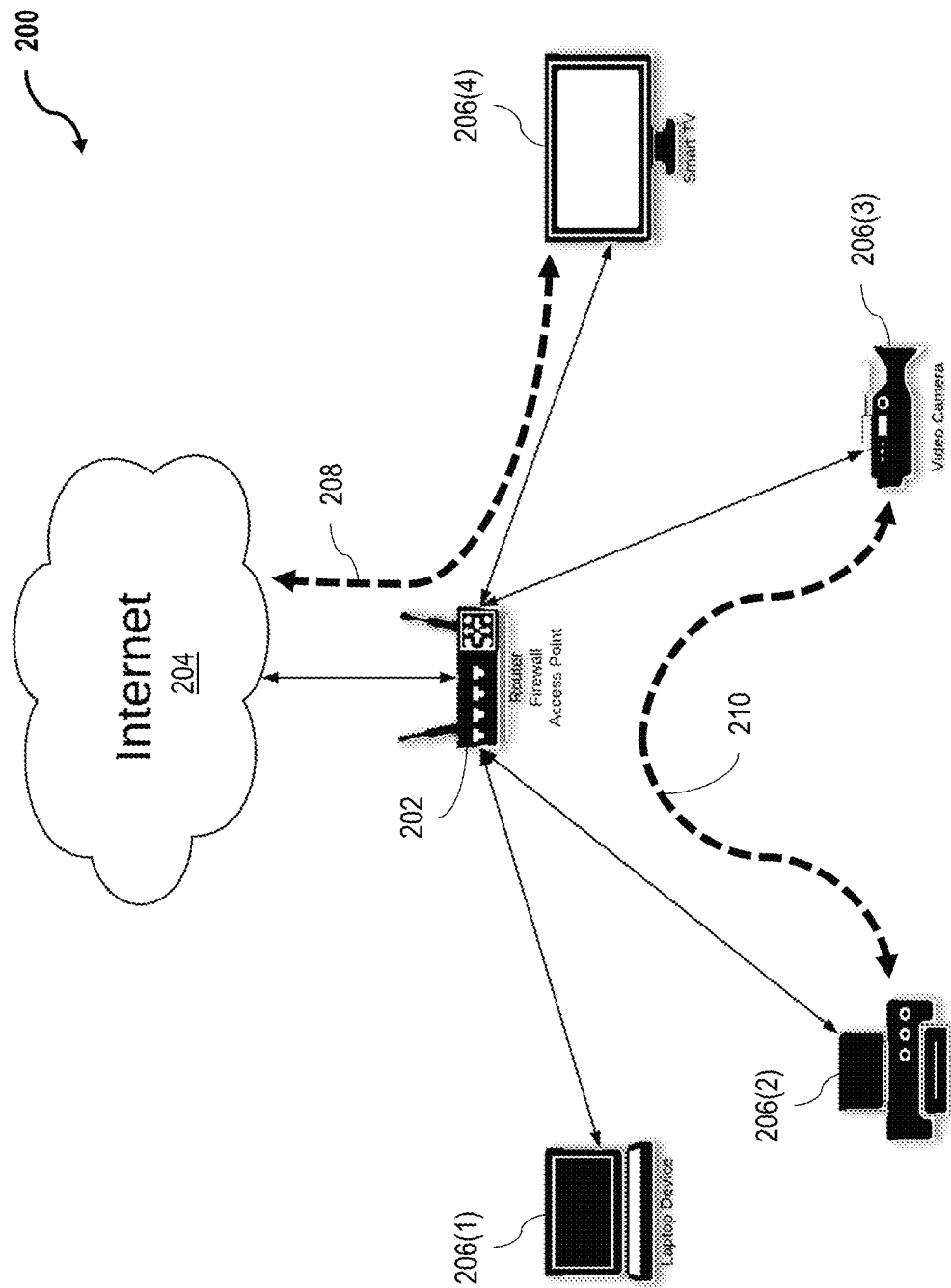
FIG. 2 is a schematic illustration of a conventional flat home network.
Figure 3:
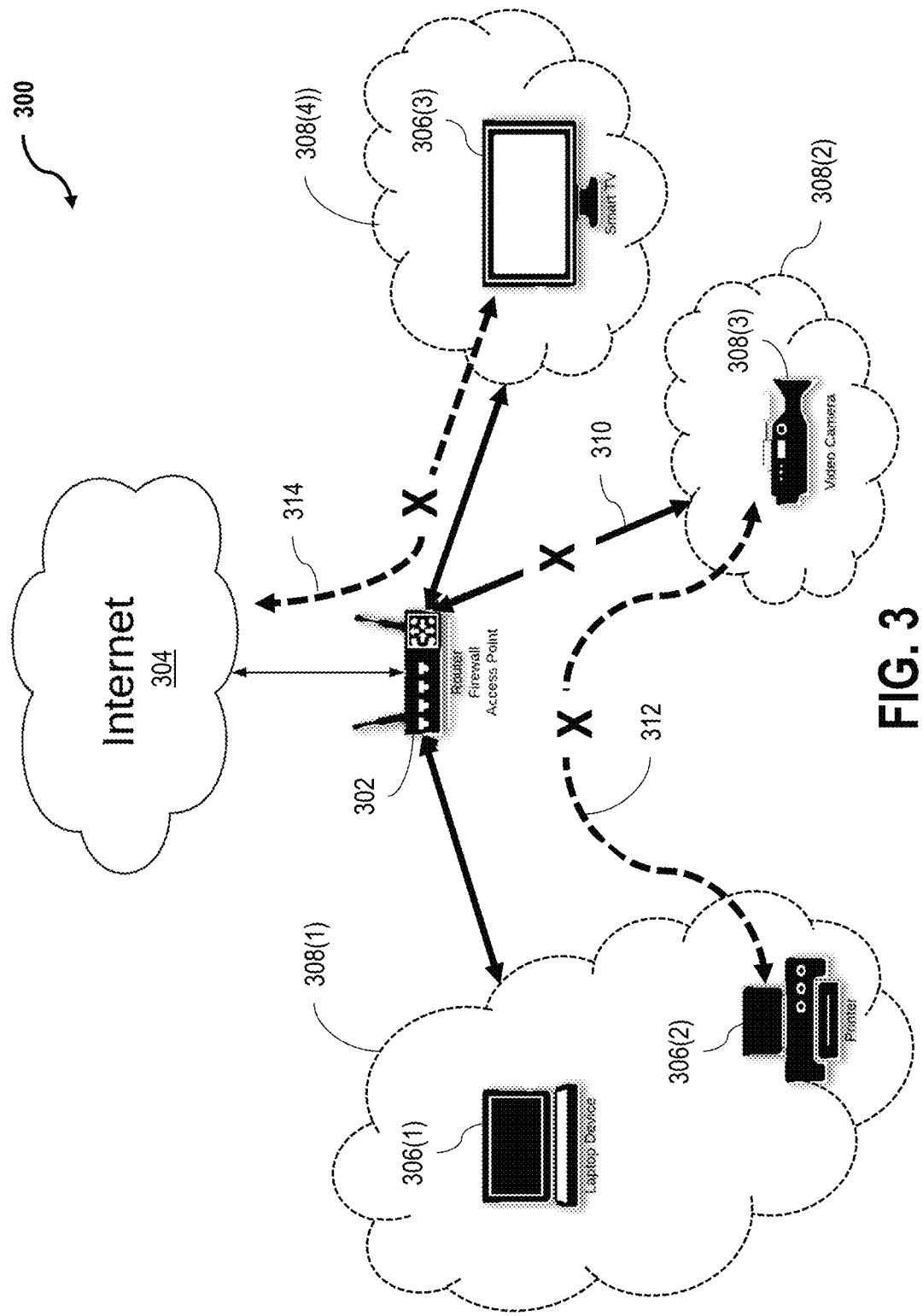
FIG. 3 is a schematic illustration of an exemplary device-centric home network.

FIG. 3 is a schematic illustration of an exemplary device-centric home network 300. Network 300 is similar to network 200, FIG. 2, and includes a central router 302 in operable communication with Internet 304 and a plurality of electronic devices 306. Network 300 differs from network 200 though, in that router 302 is configured to place each of devices 306 into one or more respective segmented networks, or sub-networks, 308. Based on the trust level of a particular device 306, the respective segmented network 308 may allow an individual device full, partial, or no access to router 302, Internet 304, and/or other devices 306.

For example, as illustrated in the exemplary embodiment depicted in FIG. 3, sub-network 308(1) represents a segmented network for devices that are scored as being more highly trusted (described further below), and permits devices 306(1) and 306(2) to communicate freely with one another within sub-network 308(1), and also with router 302, and thereby Internet 304. Sub-network 308(2), on the other hand, represents a segmented network for devices that are not scored as trustworthy, and prevents device 306(3) from accessing router 302, as illustrated by broken solid line 310, or communicating with one or more other devices 306, in a different segmented network, as illustrated by dashed line 312. In contrast, segmented network 308(3) permits device 306(4) access to router 302, and potentially to one or more other devices 306, but not to Internet 304, as illustrated by dashed line 314.

According to the advantageous configuration of network 300, communications between segmented networks 308 and/or to Internet 304 are selectively limited thereby providing a significantly improved security scheme for network 300 in comparison with network 200, discussed above. The person of ordinary skill the art will understand that the configuration illustrated for network 300 is provided for simplicity of explanation, and is not intended to be limiting. For example, more or fewer devices 306 may be placed in a particular segmented network 308. In some embodiments, a single device 306 may operate within more than a single segmented network 308.

Figure 4:
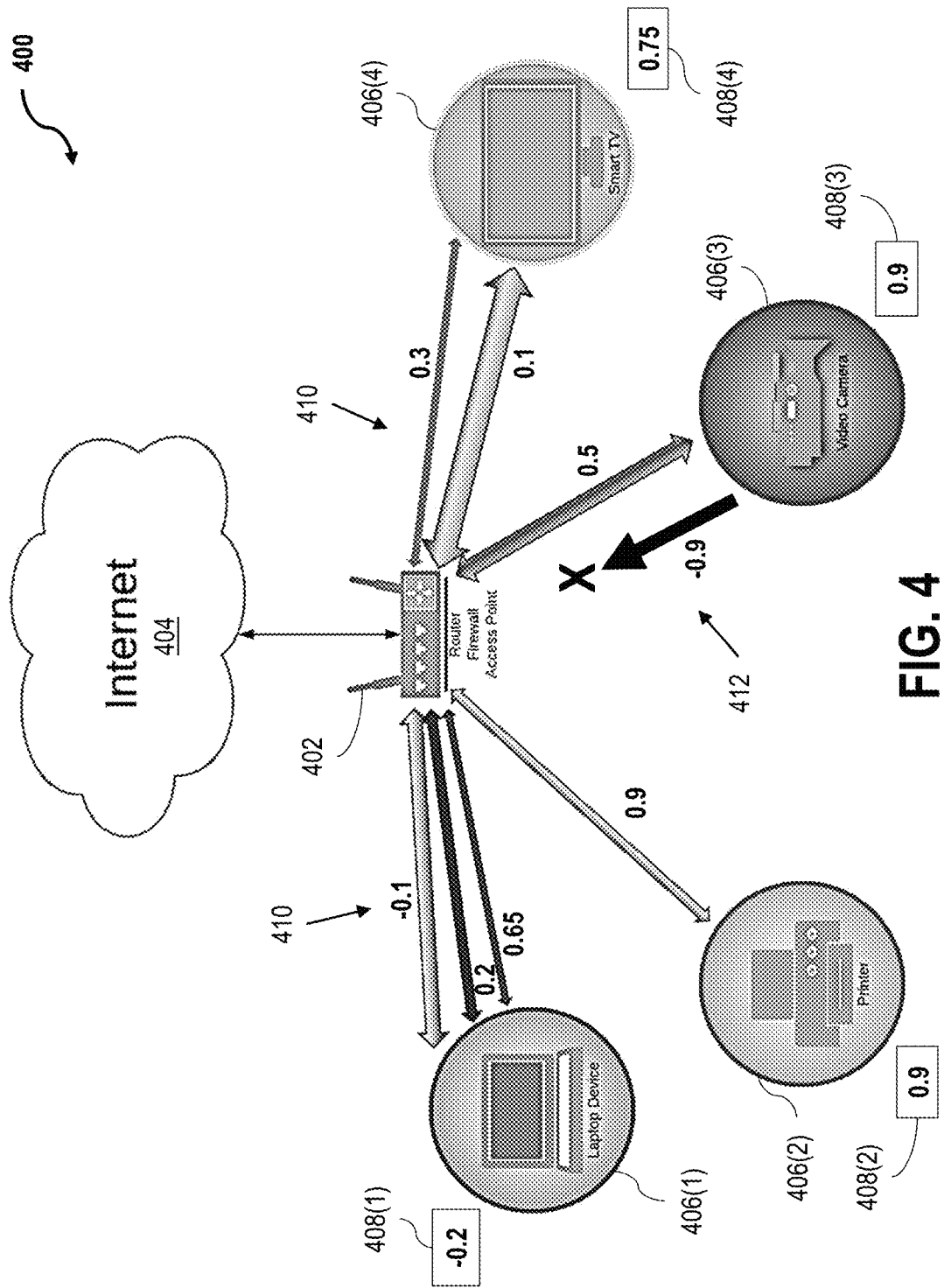
FIG. 4 is a schematic illustration of an exemplary service-centric home network.

FIG. 4 is a schematic illustration of an exemplary service-centric home network 400. Network 400 is similar to network 300, FIG. 3, and includes a central control apparatus or router 402 in operable communication with Internet 404 and a plurality of electronic devices 406. Network 400 differs from network 300 though, in that router 402 is configured to determine the device complexity score 408 (described further below) of each device 406, and also to learn the behavior and establish a rank for each and every device 406 within network 400. For ease of illustration, central control element is described as a router. In some embodiments, central control element may be an interface in communication with a network control element, which may be located remotely from the interface. In an exemplary embodiment, network 400 is further configured to rank and/or score every flow 410 to and from each device 406 (also described further below). Upon encountering a flow 412 with low confidence, i.e., low flow rank or flow score, router 402 may block that flow.

Systems and methods according to the present embodiments are thus able to advantageously determine a reliable flow confidence of a connected device using a network security model based on the probabilistic device complexity and its actual behavior on the network. In an exemplary embodiment, the behavior of an IOT device on a residential network is measured to establish a behavioral profile for the device over time. This behavioral profile may then be used to establish a confidence ranking of anomalous network flows specific to each device. As described further below, exemplary network infrastructures and architectures demonstrated the proof-of-concept of the present embodiments. In an exemplary embodiment, a network architecture further utilizes software defined networking (SDN) technology to manage network flows (e.g., allow, rate-limit, block, etc.) based on the confidence ranking. The present flow confidence ranking techniques are thus particularly advantageous for providing network-based IoT security to the residential network by limiting or blocking DDoS attacks propagated by compromised IoT devices.

The following description presents innovative solutions based on a flow-centric network configuration to provide IoT security for residential and other networks. In the flow-centric network model, the network is an active participant in the security paradigm. The network learns what each device is and what each device does, and may then calculate a confidence score for each device and apply the score to each and every flow to and from that device. This approach provides two distinct advantages and improvements over conventional approaches: (i) the network does not need any knowledge of the device type, category, or manufacturer, and may instead generate a profiled identity of a device based on its network variance and complexity; (ii) the network learns a normal behavior for every device, which enables the network to intelligently assign a score to each device flow based on both the past history and the profiled complexity of the device. According to these innovative techniques, the network obtains access control of all flows, tuned to the individual device, and is enabled to selectively block malicious flows, while allowing trusted flows.

In comparison with conventional approaches, the present systems and methods further significantly improve IoT security in three ways: (a) initial infection of vulnerable devices is more readily blocked; (b) devices that are already infected are prevented from propagating the infection further; and (c) compromised devices are blocked or slowed from participating in a DDoS attack.

In exemplary embodiments, and innovative network security process includes one or more steps of: (1) deriving a device complexity based on a flow variance and device complexity analysis; (2) establishing a probabilistic network behavioral pattern(s) for individual devices; (3) utilizing established device behavioral patterns and the derived identity to calculate a confidence score per device; and (4) implementing a flow-centric network architecture that proves model efficacy by routing, limiting, or dropping individual network flows based on the confidence score.

In exemplary embodiments, the present systems and methods focus on three main constructs of IoT network security—Behavior, Identity, and Confidence—and particularly how these constructs relate to the residential network. As used herein, "Identity" refers to what a device is. The present embodiments implement innovative techniques for determining a derived device identity based on network variance and complexity. As used herein, "Behavior" refers to what a device does. The present embodiments utilize innovative processes for learning a normal device behavior, such that anomalous behavior of the device may be more readily detected at measured. As used herein, "Confidence" refers to the conformity of a device's behavior over time combined with its learned complexity. The present embodiments provide an innovative model configured to assign a score to each flow based on the abnormality of the flow, while simultaneously accounting for the past history (i.e., behavior) and learned complexity (i.e., identity) of the device. Each of these innovative solutions, alone or in combination, represents significant improvements over conventional approaches that are not applicable to the present flow-centric network solution.

Device Identity

Identity is a complex idea that is frequently used in research regarding IoT security. Identity is applied to devices in an attempt to describe what the devices are, how the devices behave, or both. At present, there conventional consensus as to what identity is, or how to apply identity to IoT devices. Nevertheless, as applied to the IoT, two key identity subtexts are consistent: (1) explicit identity; and (2) derived identity.

Explicit identity refers to the case where a device is able to tell the network what the device is, and in a non-repudiable way. In an exemplary embodiment, explicit identity is utilized as representative of a component of trust that may be incorporated into the present confidence model is one optional technique to bootstrap an initial score for the device. In other embodiments, explicit identity may be utilized as a check against the correctness of the learned behavior analysis. Emerging Internet specifications have begun to formalize explicit identity by adding certificates to devices as part of the device certification process, such as in the case of the Open Connect Foundation (OCF) IANA standard, where each device has a CA root certificate installed that chains to a recognized root of trust provider, and in the case of the formal IETF draft for determining IoT identity in RFC 8520 for Manufacturer Usage Description (MUD), where a device signals two the network what the device is and what connection requirements it has. The device emits a MUD URL (e.g., an X.509 extension) that points to a location where the network can fetch the MUD file. The network parses the MUD file and uses it to allow network access to the device. This MUD standard, however, requires that the file is signed by the device manufacturer.

One of the biggest challenges to adding PKI broadly to the IoT realm is scalability. At present, one of the largest deployed and working PKIs in the world is from the cable industry, which uses certificates to establish trust with more than 500 million devices in cable networks. The cable ecosystem has therefore provided ample opportunity to demonstrate the efficacy of the present network security model. These initial deployments thus demonstrate the capability of the present systems and methods to scale to the far more open, and orders of magnitude larger, IoT realm.

With respect to derived identity, the National Institute of Standards and Technology (NIST) has defined 5 IoT primitives: (1) a Sensor, such as a physical device that outputs data relevant to its environment; (2) an Aggregator, such as a physical or virtual device that collects and/or transforms data; (3) a Communication Channel, such as a link or medium that transfers data between nodes or devices; (4) an External Utility which may be a processor or an abstraction for a data processor, such as a cloud based AI system; and (5) a Decision Trigger, such as a hardware component or a virtual device that outputs the final results or computations. These NIST primitives are utilized herein as the framework for innovative techniques for deriving identity based on device complexity. For example, sensors and decision triggers are considered relatively simple in terms of variance and complexity, whereas aggregators are more likely to be highly variable (e.g., IoT gateways), while external utilities align with more complex devices such as smartphones and laptops.

Apart from the IoT primitives, some recent conventional IoT security proposals have sought to derive device identity-based on network traffic. One such recent approach is known as IoT Sentinel. IoT Sentinel uses SDN machine learning to designate a device type on the network, referred to as a device fingerprint, building one classifier per device. IoT Sentinel implemented a random-forest classification algorithm, and a MAC address as the label, and fingerprinted devices on the Zigbee and ZWave platforms. The IoT Sentinel proposal tested 27 devices using the algorithm, and captured packets as a device joined the network. Only the first 12 packets were used, and 23 network features were defined based on the device's traffic and the packet headers. The 23 features are based on layer two, three, and four of the OSI networking stack. The proposal assumed that the packet bodies would be encrypted, and therefore the approach utilized the unencrypted portions of the traffic, such as the IP header information.

The IoT Sentinel identification was performed during the initial setup phase of the device on the network, and attempted to identify a device based on a only the first 12 packets captured as the device was initially joined and onboarded onto the network. Once the device was identified, IoT Sentinel queried the Common Vulnerabilities and Exposures (CVE) to determine if the device had any vulnerabilities. If the device was found to be vulnerable, a customized SDN controller and OpenVSwitch provided an OpenFlow enabled virtual network switch to segregate the device into three zones: (a) strict—no Internet access, allowed to communicate only with other untrusted devices; (b) restricted—able to talk to a limited setup of vendor addresses and other untrusted devices; and (c) trusted—unrestricted Internet access and ability to communicate with other devices on the network.

IoT Sentinel reported an overall identification accuracy of 81.5%, with 17 of the 27 devices identified with 95.0% accuracy. For the remaining 10 devices, however, identification accuracy was only 50%, which is problematic, since these 10 devices were generally different devices from the same manufacturer. Accordingly, although IoT Sentinel was able to reasonably discriminate between devices having different hardware or firmware, it was unable to produce effective results two fingerprint devices made by the same manufacturer, and thus had the same firmware for the IoT Sentinel classifier. Even though two similar devices from the same manufacturer may have the same vulnerabilities, one device may be compromised on a network while the other is not. It is important to prevent an infection from one device from propagating to another, and particularly with the second device is most likely to be as vulnerable.

IoT Sentinel further required a pre-trained classifier per device, which does not scale because the same device running different firmware will match different and separate classifiers. IoT Sentinel requires a supervised learning algorithm that must be individually trained on each device type, and then must be re-trained if the device firmware changes. This re-training requirement renders the IoT Sentinel approach difficult to scale to the myriad of heterogeneous devices in operation. IoT Sentinel additionally requires an extensive online database of trained classifiers, which makes this approach reliant on the accuracy of, not just one, but two public databases, i.e., the CVE database, and the online database of trained classifiers.

Furthermore, by only analyzing the device during setup, this conventional approach is unable to detect the vast majority of the device behavior on the network. If the device is compromised after being installed, IoT Sentinel is unlikely to recognize the compromise. Moreover, since the classifiers used in this approach were unable to distinguish between very similar devices, a high probability of false positives is likely. This high probability of false positives may present severe consequences if the device in question is a critical medical device. In contrast, the present flow-centric embodiments are capable of adequately addressing all of these challenges.

Attempts to build upon the IoT Sentinel platform have also faced significant hurdles. One such attempt proposed using a machine learning approach to broadly identify a device and place the device in a predefined category (e.g., a light bulb). This device fingerprinting approach suffers from problems similar to those arising from the IoT Sentinel approach. In particular, this proposal also uses a supervised approach to fingerprinting and categorization, which requires labeled data for each device which is undesirable. Additionally, this approach assumes that the ability to detect a distinct command and response structure in the data from any particular device, but tested only a relatively small sample size of devices, thereby rendering this approach potentially ineffectual for more complex devices where aspects like encryption may interfere with the ability to detect the command and response structure.

The reported results from this approach indicate accurate classification of devices into the existing broad categories, but not that this approach performs the same in the case of new devices that may not conform to broad classifiers. This approach still requires some way for the network to know about categories of devices, and does not address how to incorporate new categories into its learning model.

Another recent IoT security proposal utilized artificial neural network intrusion detection systems to perform threat analyses of IoT networks. More particularly, the neural networks performed supervised machine learning to detect anomalies in the IoT. A multi-layer neural network classified normal traffic from DDoS traffic using three feed forward layers and back propagation, as well as a stochastic gradient descent to reduce the cost function. The threat analysis was performed on a KDD 99 intrusion detection data set, with the data set labeled with a variety of intrusions on a simulated network. The approach claims capability for detecting attacks with an overall accuracy of 99.4%, and an overall 0.6% false positive rate. The simulated network and the original data set therefrom, however, are not practical to the present-day IoT or the rapidly-growing direction in which the IoT is clearly heading. The labeled attack data does not exist in real-world situations, nor does it anticipate the ever-growing new and emerging threats to the IoT. In contrast, the innovative systems and methods herein are dynamically responsive to present, unknown, real-world security threats.

Another proposal for IoT security advanced a trust management system design that included a context-aware and multi-service approach. This approach applied a centralized trust model specific to IoT networks, and every IoT device (node) rates interactions with peer nodes, and the nodes evaluate peers based on capabilities (such as CPU, memory, battery level), how a node performs a task (i.e., whether the node delivered a correct output, time to complete task). This approach, however, was generally effective in the case of a homogenous IoT network, where the nodes and tasks are similar, and did not apply well to the heterogeneity of a home residential network. Furthermore, by tying trust to the performance of a node, the system was prone to failures unrelated to malicious nodes, and also slowed the overall network performance and overloaded some nodes by the additional tasks required to evaluate peers.

Device Behavior

To evaluate the devices behavior the present systems and methods advantageously first determine what constitutes normal behavior for the device. One previous technique for analyzing the behavior of an IoT sensor used data from sensors to determine if the values are out of normal range. To bootstrap the system, an offline reference model of normal behavior was constructed using a matrix of discrete wavelet transforms, which was compared with a run-time model of the sensor and determine the Euclidean distance between the reference and run-time profiles. Using the actual values from each sensor (e.g., temperature, pressure), however, creates as many disadvantages as advantages. For example, an advantage of this approach is that it makes the detection of anomalous behavior agnostic to the underlying protocol, which may be particularly useful for sensors that run over Wifi, Zigbee, ZWave, etc.

A significant disadvantage of using sensor values though, is that the detection engine is required to perform deep packet inspection of the traffic to obtain the sensor data. In the case where the packet data is encrypted, this approach as significant overhead to the cost of implementation. Also significant, this approach is unable to address protocol-layer attacks that may not influence the higher-layer application data that is being analyzed. Additionally, this approach only analyzes the data for abnormal values; the approach is unable to address the case of a malicious sensor that is actually correctly sending higher-level application data, but nevertheless may be participating in a DDoS attack at the IP-layer.

A different conventional approach proposed a system to analyze network traffic on a per-device basis using use the MAC address of the device, combined with DNS traffic, of the device to identify what device type it is. The traffic per-device was then analyzed, as well as the number of requests each device produces. Whereas this approach provides interesting statistics about a number of devices on the network, the proposed approach does not suggest how to develop a fingerprint for each device, nor does the approach develop a model for the behavior of each device.

Another conventional approach proposed a Behavioral Modeling Intrusion Detection system (BMIDS) strategy to recognize IoT behavior in a residential network, using immunity-inspired algorithms to determine if behavioral patterns match or deviate from a desired behavioral profile. The BMIDS approach was novel in that it attempted to model the interactions between various actors in an OpenSIM world, and at a very high-level (i.e., high level human-human, human-device, and human-sensor interactions) to develop behavioral patterns for IoT devices. In particular, the BMIDS strategy utilized a Non Playing Character (NPC) in the OpenSIM paradigm to establish a normal behavioral profile within the simulated world, and then exported the obtained data from the OpenSIM simulation into feature vectors for input into a focused IDS method and an anomaly detection method. The BMIDS system did not, however, explain how to adapt the model behavior from the simulated environment into a real-world smart home.

Other conventional approaches have focused more on detecting the anomalous behavior than on establishing a normal behavior model. One known approach proposed a two-stage outlier detection methodology to detect network scanners based on functional principal component analysis and k-means clustering using a synthetic dataset from the 2009 Defense Advanced Research Project Agency (DARPA). The two-stage methodology was run against both the DARPA dataset, and against a real-world NTP dataset that included data collected both before and after a documented NTP scanner attack. In both comparative data sets, the relevant algorithm identified all source IP that contacted a large number of destinations. Although this approach did not provide a behavioral model that is directly applicable to residential networks, the results of the clustering analysis enable categorization of the anomalous source IP traffic into four categories ranging from blatant scanners to normal NTP traffic.

The broad concept of utilizing various aspects of data flow variance on a network to allow or limit traffic, on the other hand, is generally known in the field. In RFC 2212 Guaranteed Quality of Service (QoS) the use of a token bucket algorithm was proposed to impose QoS policies to network traffic. The token bucket approach examined packets arriving to determine if the packets fit a predetermined metric before the packets are added to the bucket (queuing strategy). In this technique, the variance of the arrival of the packets was calculated to determine if the packets meet criteria for addition to the token bucket is to calculate the variance of their arrival, and packets that do not conform to the predetermined metric are dropped. The approach of RFC 2212 was designed to control the maximum queuing delay in a network where all the devices in a path implement the same flow control strategy.

As explained further below though, the variance approach introduced in RFC 2212 is different from the innovative variance approach of the present embodiments. For example, the token bucket strategy of RFC 2212 only utilizes layer two-based information, and does not consider any layer three information. Furthermore, the approach of RFC 2212 only operates at the network flow level and does not link flow information back to a device.

Device Confidence

Confidence, as defined herein, refers to a very specific subset of trust, which is itself a form of non-binary access control. Within the IoT network paradigm, confidence is dynamic and may change over time as network conditions and data change. In an exemplary embodiment, confidence is probabilistic and is calculated based on the averages of several inputs. Confidence thus forms the part of trust that is derived from direct knowledge and experience, and which does not incorporate recommendation, or reputation. The determination and implementation of confidence with respect to IoT security; most conventional research has focused instead on how trust affects IoT security, namely, IoT trust models.

Conventional IoT trust models have focused on three factors of trust: (1) Experience (E); (2) Knowledge (K); and (3) Recommendation (R). In the IoT context, Experience refers to a historical relationship with a device, i.e., how the device has behaved in the network, and with other devices on the network. Knowledge, on the other hand, refers to directly known attributes of a device, such as device type, a valid signed certificate, etc. Recommendation refers to indirect information about a device given by a third party, often based on the direct experience of the third party with the device, which may then be shared with other nodes on the network.

One proposed trust-based management system for IoT networks considered both the direct experience and the indirect experience to update trust values among IoT devices with heterogeneous resource capabilities using a five-phase adaptive model. As described above, this type of contextual trust system is best suited to a homogeneous environment where each device's capabilities are well known, and where the tasks are also relatively predictable and deterministic, but does not adapt well to the heterogeneous residential IoT network. Additionally, although this conventional system is somewhat resilient to malicious or mis-performing nodes, where the reputation of a node is calculated based on performance, the system is significantly more susceptible to systemic failures. For example, even a benign event that triggers many nodes to have slow or incorrect responses might conceivably cause the system to collapse.

Accordingly, the present systems and methods overcome these conventional difficulties as well by enabling a network security model that derives a device complexity based on flow variance and endpoint analysis, establishes a probabilistic network behavioral model for individual devices, utilizes this established device behavioral model and the derived complexity to calculate a confidence score per device, and ranks every flow to and from the device using the device confidence metric. In an exemplary embodiment, an efficient network infrastructure is deployed to prove the efficacy of the flow-centric architecture by enabling centralized control from a router and/or AP to forward, rate-limit, and/or block flows based on the device confidence. In some embodiments, the device confidence metric may be generated in three steps: (1) determining the complexity of the device; (2) analyzing the device behavior; and (3) calculating a device confidence score based on the determined device complexity and the learned behavior of the device over time.

In the exemplary embodiment, a flow-centric network model is provided that enables the network to derive identity based on device complexity, and then build a behavior model based on device's network flow history. The behavioral model may then be combined with derived identity to calculate a composite confidence score for each device. In some embodiments, the network is further enabled to detect an anomalous flow and apply the calculated confidence score to the device to manage the excess of the device to the Internet or other portions of the network. An exemplary system architecture is described further below with respect to FIG. 5, which demonstrates the efficacy of the present network security techniques in response to the introduction of a device that simulates a DDoS attack.

Figure 5:
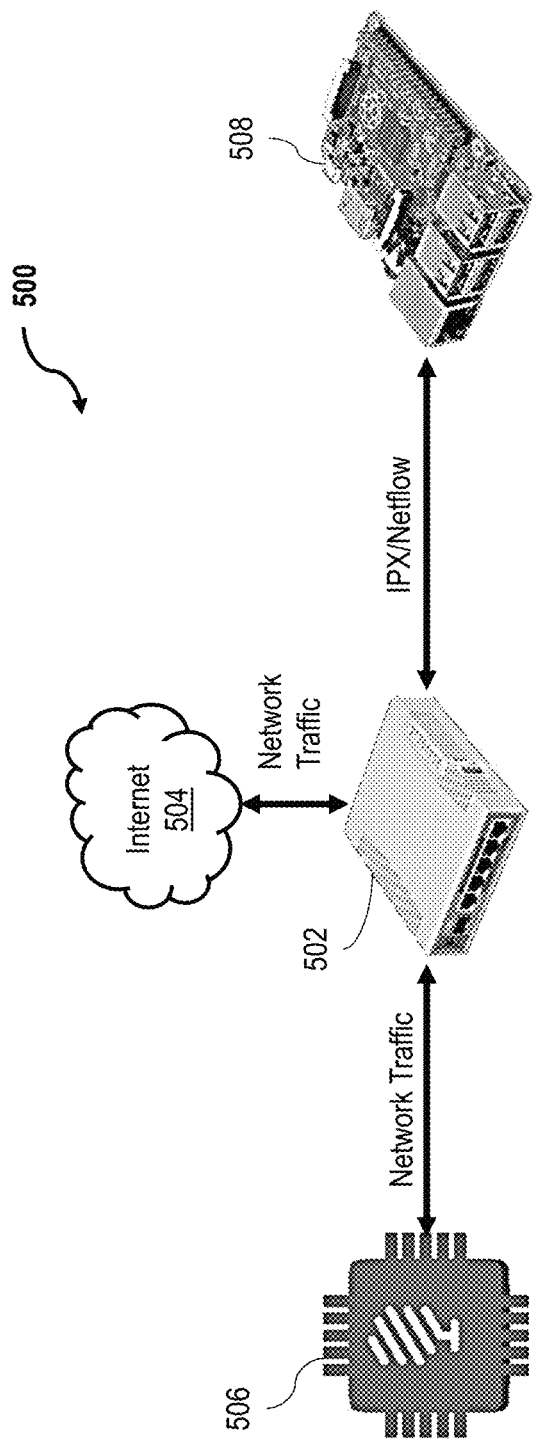
FIG. 5 is a schematic illustration of an exemplary data collection architecture.

FIG. 5 is a schematic illustration of an exemplary data collection architecture 500. Architecture 500 is similar to network 400, FIG. 4, in its general configuration, and includes a central router 502 in operable communication with Internet 504 and an electronic device 506. Architecture 500 differs from network 400 though, in that, for this real-world implementation, router 502 is additionally in operable communication with a network traffic monitor 508.

In actual operation, router 502 was a MicroTik router, and network traffic monitor 508 was a Raspberry Pi with an installed nProbe. Data was collected from an actual residential network having approximately 25 connected devices 506, ranging from general computing devices (e.g., laptops and smartphones) and IoT hubs having several IoT Devices using Zigbee or Zwave, to single-purpose devices, such as light bulbs and temperature sensors. Data was collected by a router 502 from the several electronic devices 506, and then sent by router 502 as that Netflow/IPX data to the nProbe running on the Raspberry Pi of network traffic monitor 508. In this example, the flows were stored in a MariaDB relational database (not separately shown). Features of the data collected by architecture 500 are listed below with respect to Table 1.

TABLE 1

| Feature | Description |
| --- | --- |
| IPV4_SRC_ADDR | IPv4 Source Address |
| IPV4_DST_ADDR | IPv4 Destination Address |
| IN_PKTS | Incoming flow packets (Device->Destination) |
| IN_BYTES | Incoming flow bytes (Device->Remote) |
| OUT_PKTS | Outgoing flow packets (Remote->Device) |
| OUT_BYTES | Outgoing flow bytes (Remote->Device) |
| L4_SRC_PORT | IPv4 Source Port |
| L4-DST_PORT | IPv4 Destination Port |
| PROTOCOL | IP Protocol Identifier |

As used herein, a network flow is defined as a sequence of packets where each packet has the same tuple, that is, source address, destination address, source port, destination port, and protocol. In this example, the flows were based on traffic and not time. As such, all variance and anomaly detection (described further below) was based on the actual traffic statistics, and not the time the data was produced. Time domain variance is extremely complex in even small networks of devices and, although compatible with the scope of the present disclosure, is not addressed further herein.

In further operation, the flows were aggregated with a maximum of 30 minutes per flow and an inactive flow timeout of 15 seconds. That is, for devices not having exchanged traffic in 15 seconds, the flow was considered completed, and then recorded. For training and test data sets, the data was filtered by an individual IP address, and the test environment was configured such that devices 506 always received the same IPv4 address. The flows were then sorted by time-stamp to eliminate time as a variance factor for this proof-of-concept. Using this configuration, the flow-centric network model was developed, and the underlying determinations and calculations therein performed.

Flow-Centric Network Model

As described above the present network security systems and methods derive the device identity as a factor in the competence calculation. As described herein, the derived device identity refers to the measure of the network complexity of the device over time. In other words, the identity of the device may be derived by examining the network traffic of the device over time and composing an aggregated complexity score therefrom for each device.

The present trust model thus advantageously improves upon conventional techniques by enabling enforcement of fine-grained access control for various devices depending on the perceived trust values of the devices. In an exemplary embodiment, the obtained trust values are normalized within the range [0, 1]. Accordingly, the present trust model is formally defined such that accurate estimation of the trust of various devices is based on one or more of a particular set of metrics. The trust model is then enabled to compute/calculate the degree to which an attached or connected device may be trusted by measuring different trust indicators relevant to the device.

In an exemplary embodiment, systems and methods described herein are further advantageously capable of dynamically monitoring triggers, for example, changes to the already-determined parameters or metrics that lead to changes in values of the measured trust indicators. Accordingly, the trust values at a given moment or over a period of time may then be used to dynamically enforce the access control policies corresponding to the particular trust levels of the operator.

For the first step of the device confidence metric calculation, determination is made as to where the device falls on device complexity scale 100, FIG. 1. In an exemplary embodiment, the derived device complexity may be based on IP endpoint analysis and/or flow variance. In an exemplary embodiment, the IP analysis of derived device complexity utilizes an IP Tree/Branch/Leaf format.

Derived Device Complexity—IP Analysis

As used herein, an IP tree refers to a unique first order octet that forms the "root" of the tree. As used herein, an IP Branch refers to a first, second, or third order octet under which are one or more fourth order octets (i.e., IP Leaves). An IP Leaf is thus one such unique fourth order octet. Using this IP Tree format, the present systems and methods are able to more reliably determine how the devices form connections, and from this analysis, calculate the IP spread and the IP depth therefrom. As used herein, the IP spread refers to the number of unique source and destination IP addresses that interact with the device, and the IP depth refers to the number of IP addresses that belong to the same higher level octets, i.e., are from the same class of network.

To calculate the IP spread and the IP depth, unordered IP trees were built for each IP address where the first order octet is the root and lower octets are children thereof. From this configuration, the number of trees, branches, and leaf nodes contacted by each IoT device may be calculated. In this case, a large number of IP trees having few IP branches indicates a large IP spread, whereas a small number of IP trees having many IP branches and IP leaves indicates a large IP depth. The calculated values for IP depth and IP spread thus provide one valuable measure of a device's complexity.

Device Complexity and Classification

As described herein, the device complexity is an aggregate measurement of a device's IP connections, $d_{ip}$, and amount of device traffic variance $d_v$ over time. Using the IP tree analysis described above, the device IP spread is defined as the sum total of unique IP addresses that interact with a device, and may be calculated according to:

$$P_{Spread} = \Sigma IP_{trees} \quad \text{(Eq. 1)}$$

The device IP Depth is then defined as the number of addresses that interact with a device and belong to the same higher order octets. The device IP depth may be calculated according to:

$$IP_{Depth} = \frac{\Sigma IP_{leaf}}{\Sigma IP_{branch}} \quad \text{(Eq. 2)}$$

The Device IP Complexity $d_{ip}$ may thus be calculated as:

$$d_{ip} = \frac{IP_{Spread}}{IP_{Depth}} \quad \text{(Eq. 3)}$$

In an exemplary embodiment, a device IP complexity algorithm is provided as follows:

Input: Set of IP addresses for device, stored as a trees
Output: Device IP Complexity
for ipTree in ipForest do
  | | if ipTree.FirstOctet is unique then
    | | ipSpread++
  | else
    | | if ipTree.SecondOctet is unique then
      | | | totalBranches++

```
| | end
| | if ipTree.ThirdOctet is unique then
| | | totalBranches++
| | end
| | if ipTree.FourthOctet is unique then
| | | ipLeaves++
| | end
| end
end
ipDepth=ipLeaves/totalBranches
ipComplexity=ipSpread/ipDepth
```

Figure 6:
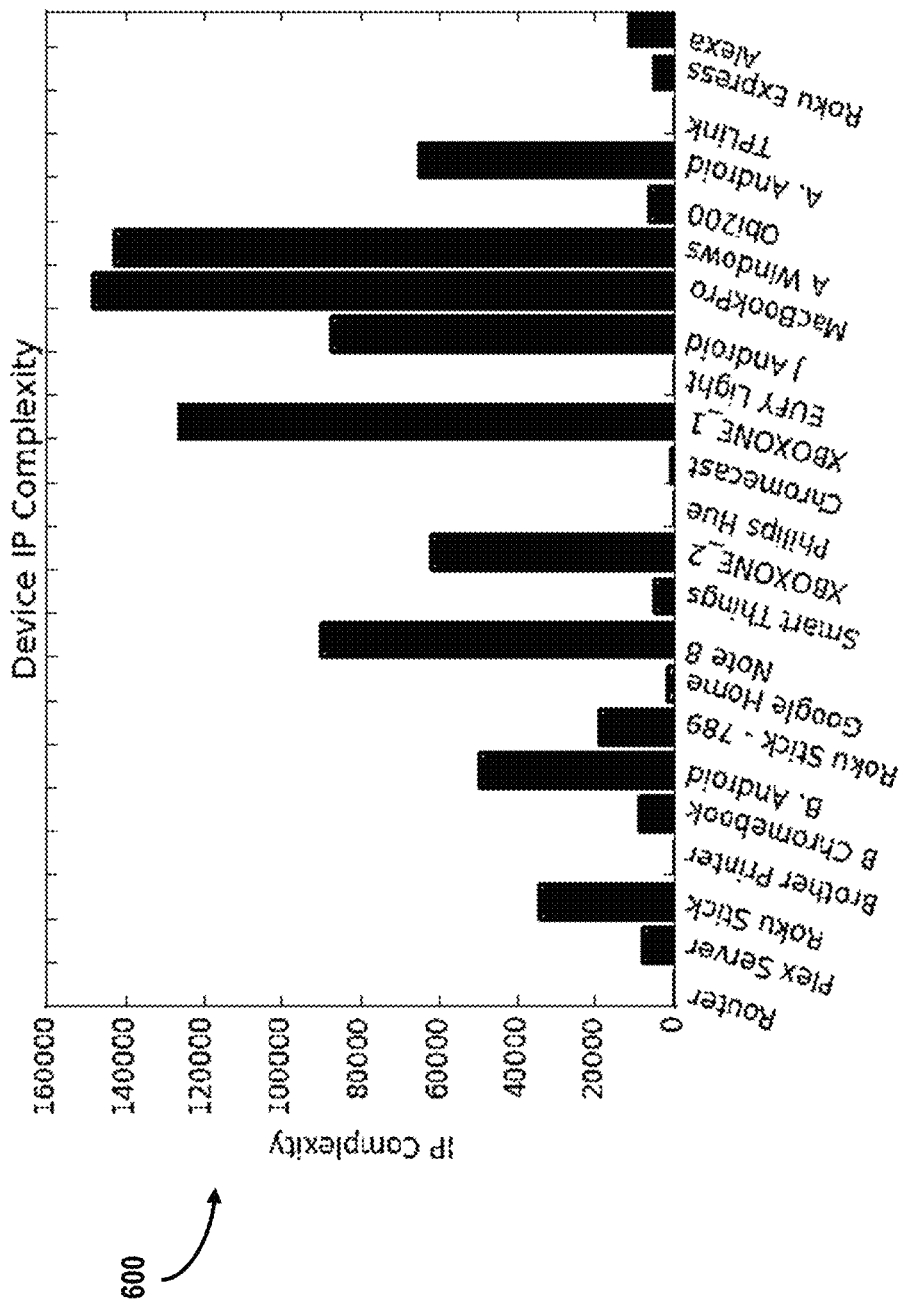
FIG. 6 is a graphical illustration depicting an exemplary plot of derived device complexities from the architecture depicted in FIG. 5.

The total IP complexity of each device is illustrated with respect to FIG. 6.

FIG. 6 is a graphical illustration depicting an exemplary plot 600 of derived device complexities from architecture 500, FIG. 5. In the embodiment depicted in FIG. 6, the representative bar graph of plot 600 illustrates the respective IP complexity for a selected representative group of the 25 devices from which data was collected using architecture 500. As illustrated in plot 600, devices belonging to a single ecosystem such as Google Home devices exhibit lower IP complexity values. Calculations for these types of devices yield a small number of broad trees, since such devices generally connect to mostly Google networks dedicated to these types of devices. In contrast, general purpose devices such as laptops and smart phones exhibit a higher IP complexity value due to a larger calculated IP spread. For these higher-complexity value devices, the calculated values for each IP tree have fewer IP branches and IP leaves.

Figure 7:
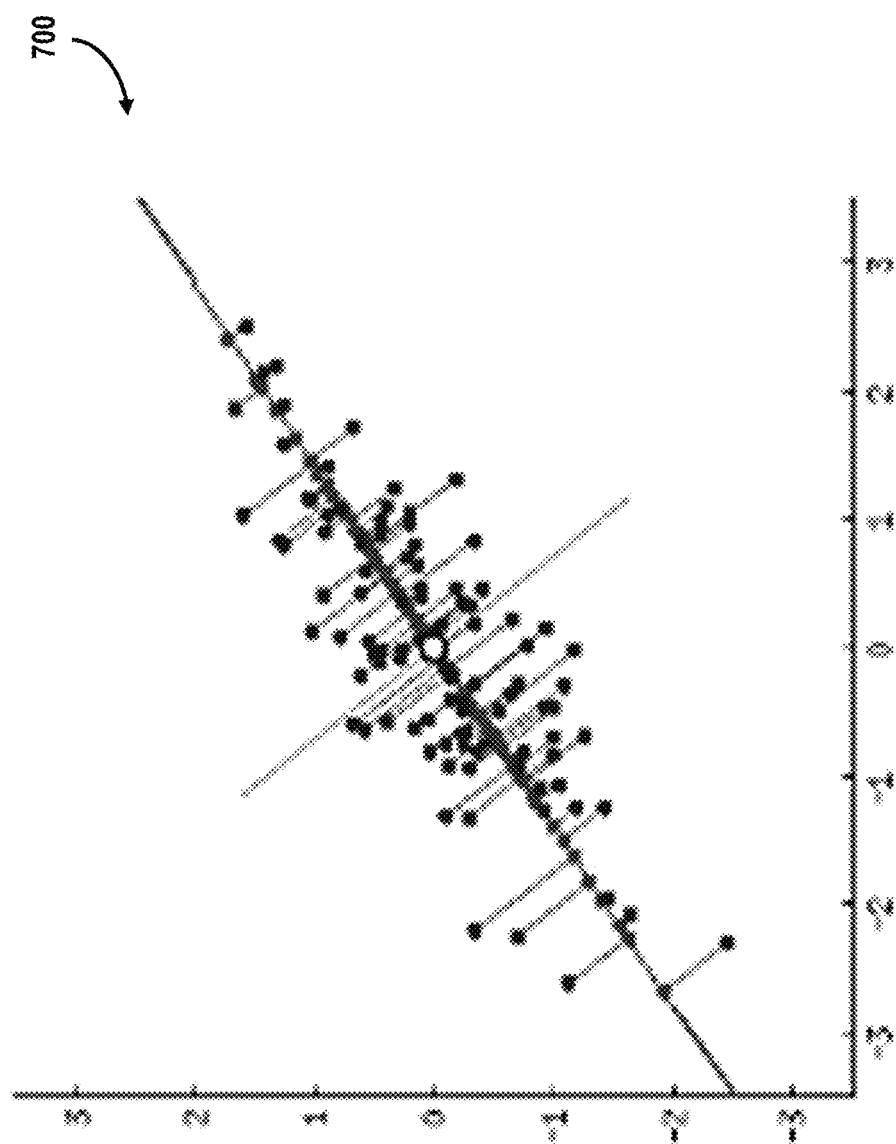
FIG. 7 is a graphical illustration depicting an exemplary plot of flow feature dispersion of the derived device complexities depicted in FIG. 6.

FIG. 7 is a graphical illustration depicting an exemplary plot 700 of flow feature dispersion of the derived device complexities depicted in plot 600, FIG. 6. More particularly, due to the variance (i.e., dispersion) in the derived device complexities, plot 700 serves to explain the variance of the respective flow features, as discussed further below.

Figure 8:
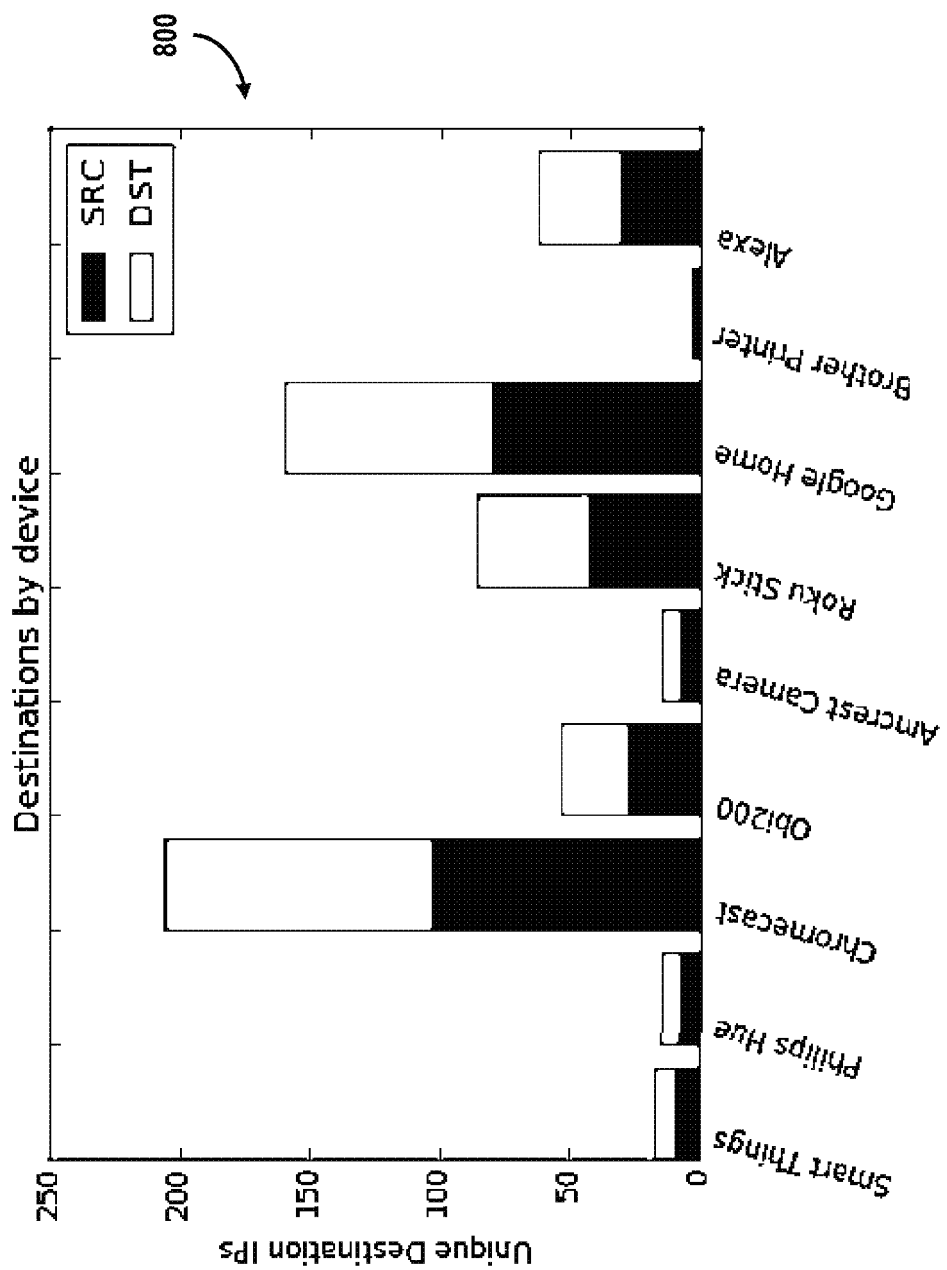
FIG. 8 is a graphical illustration depicting an exemplary plot of Internet protocol destinations per device.

FIG. 8 is a graphical illustration depicting an exemplary plot 800 of IP destinations per device. As demonstrated by plot 800, despite the considerably lower IP complexity values for the Google devices, several of these devices exhibit the highest number of IP destinations.

The Derived Device Identity $d_i$ may then be calculated according to:

$$d_i = w_{ip} d_{ip} + w_v |d_v| \qquad \text{(Eq. 4)}$$

where $d_{ip}$ is the device IP complexity, $d_v$ is the device variance, $w_{ip}$ is the weight of IP complexity, and $w_v$ is the weight of variance.

The device variance metric is calculated based on the broader simple notion that devices on a network will vary, and therefore present different variances, based on what they do on the network. In an exemplary embodiment, the explained variance score is computed over the flow history of the device. The explained variance score provides a normalized measure of the dispersion (e.g., FIG. 7, above) of the data between a training subset and a test subset. In exemplary implementation, the explained variance utilizes an even split of samples for the respective training and testing purposes. In one embodiment though, 80% were dedicated for training and 20% for testing. The device variance though, is expected to depend on the device type, as described further below with respect to FIG. 9.

Figure 9:
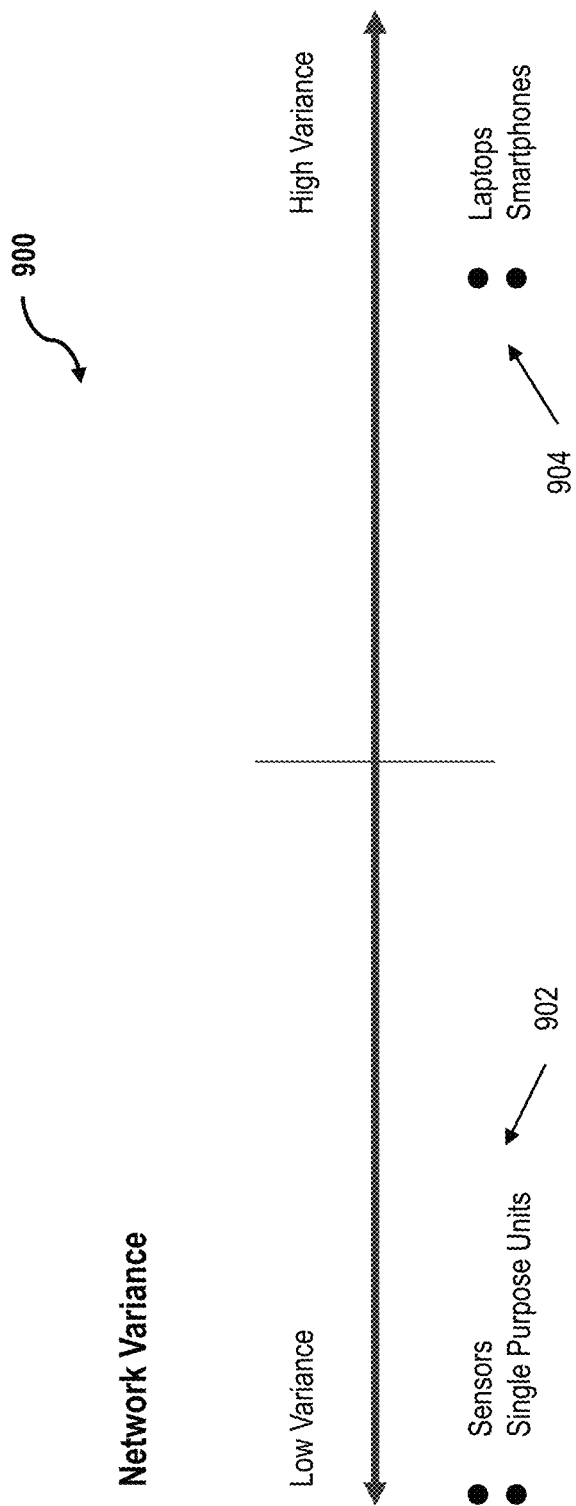
FIG. 9 is a graphical illustration depicting an exemplary spectrum of network variance.

FIG. 9 is a graphical illustration depicting an exemplary spectrum 900 of network variance. Network variance spectrum 900 is quite similar to device complexity scale 100, FIG. 1, due to the fact that higher-complexity devices are expected to perform a wider variety of tasks on the network. As illustrated in the embodiment depicted in FIG. 9, lower-variance devices 902 (e.g., sensors, single-purpose devices) exhibit considerably lower variance in comparison with higher-variance devices 904 (e.g., laptops, smartphones). The determination of where a particular device lands within spectrum 900 may be calculated as follows.

In an exemplary embodiment, the device variance is the explained variance score $d_v$ of the device, averaged over a past historic window, which was, for this implementation, a time-based window extending over the past thirty days. The person of ordinary skill in the art though, will understand that such time-based windows are not limited to 30-day periods, and may be based on a selected or minimum number of flows, the desired time frame, or both. The explained variance score $d_v$ may be calculated as follows:

$$d_v = \sum_{n=0}^{n=Current} \frac{d_{vn}}{n} \qquad \text{(Eq. 5)}$$

$$d_{vn}(f, \hat{f}) = 1 - \frac{\text{Var}(f - \hat{f})}{\text{Var}(f)} \qquad \text{(Eq. 6)}$$

where $\hat{f}$ represents $\text{win}_{n-1}$ flows, and $f$ represents $\text{win}_n$ flows. The variance $\sigma^2$ is the standard deviation squared, and may be calculated according to:

$$\text{Var}(f) = \sigma^2 = \frac{\sum_{i=1}^{n}(x_i - \bar{x})^2}{n - 1} \qquad \text{(Eq. 7)}$$

Figure 10:
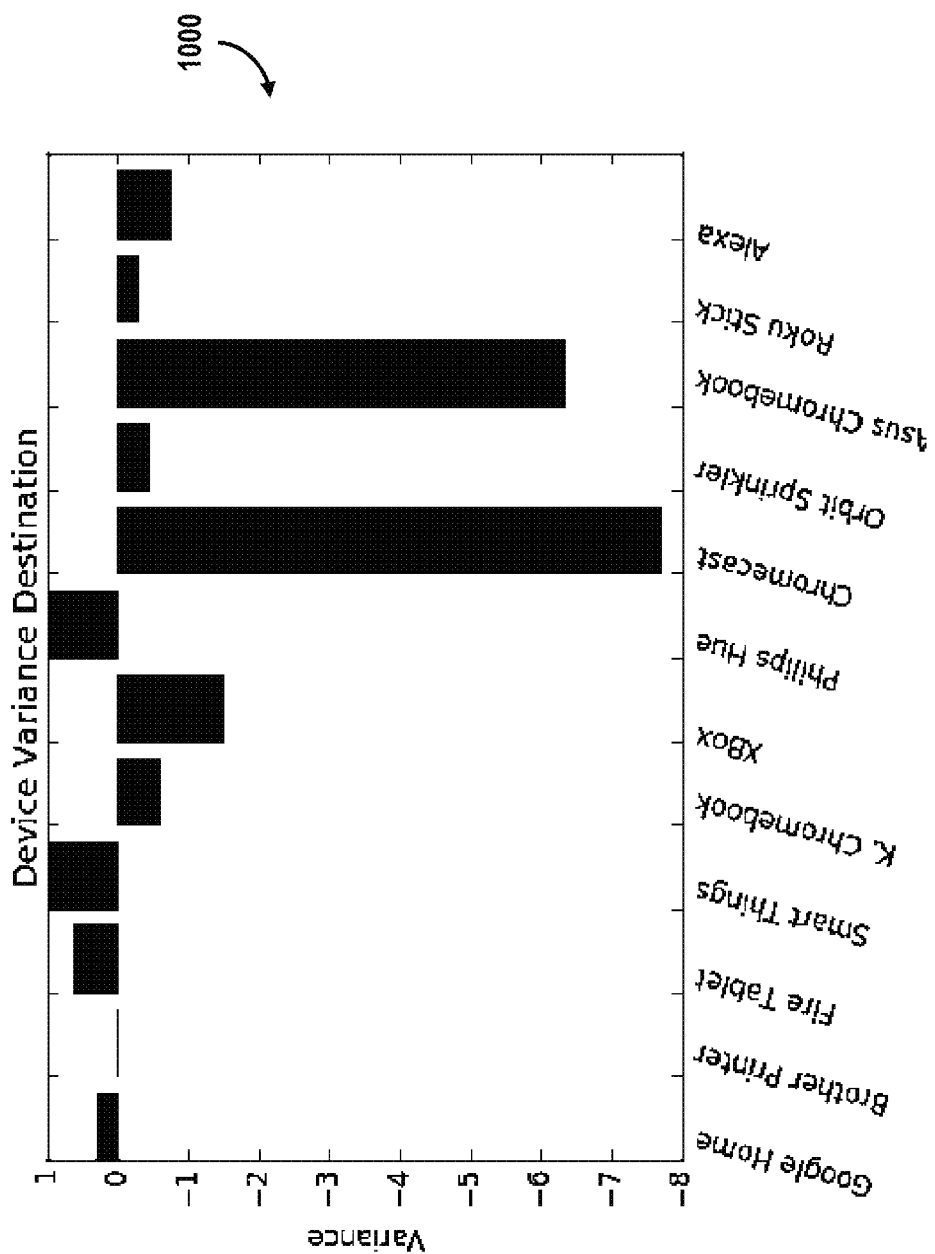
FIG. 10 is a graphical illustration depicting an exemplary plot of network variance per device.

FIG. 10 is a graphical illustration depicting an exemplary plot 1000 of network variance per device. More particularly, plot 1000 illustrates the non-normalized network variance of device destinations for the selected group of devices measured by architecture 500. As can be seen within plot 1000, the Chromecast device, for example, did not follow the logical idea that simpler IoT devices necessarily exhibit lower variances. For purposes of thoroughness, the variance of router 502 and the Raspberry Pi network monitor 508 were also included.

Accordingly, in an exemplary embodiment, a device variance algorithm may be written and/or program according to the following computer-executable instructions:

```
Input: n flows
Output: Device Variance d_v
let n=0, sum=0, sumSq=0
for x in set of flows do
  | n++
  | sum=sum+x
  | sumSq=sumSq+x²
end
d_v=(sumSq-(sum²)/n)/(n-1)
```

Figure 11:
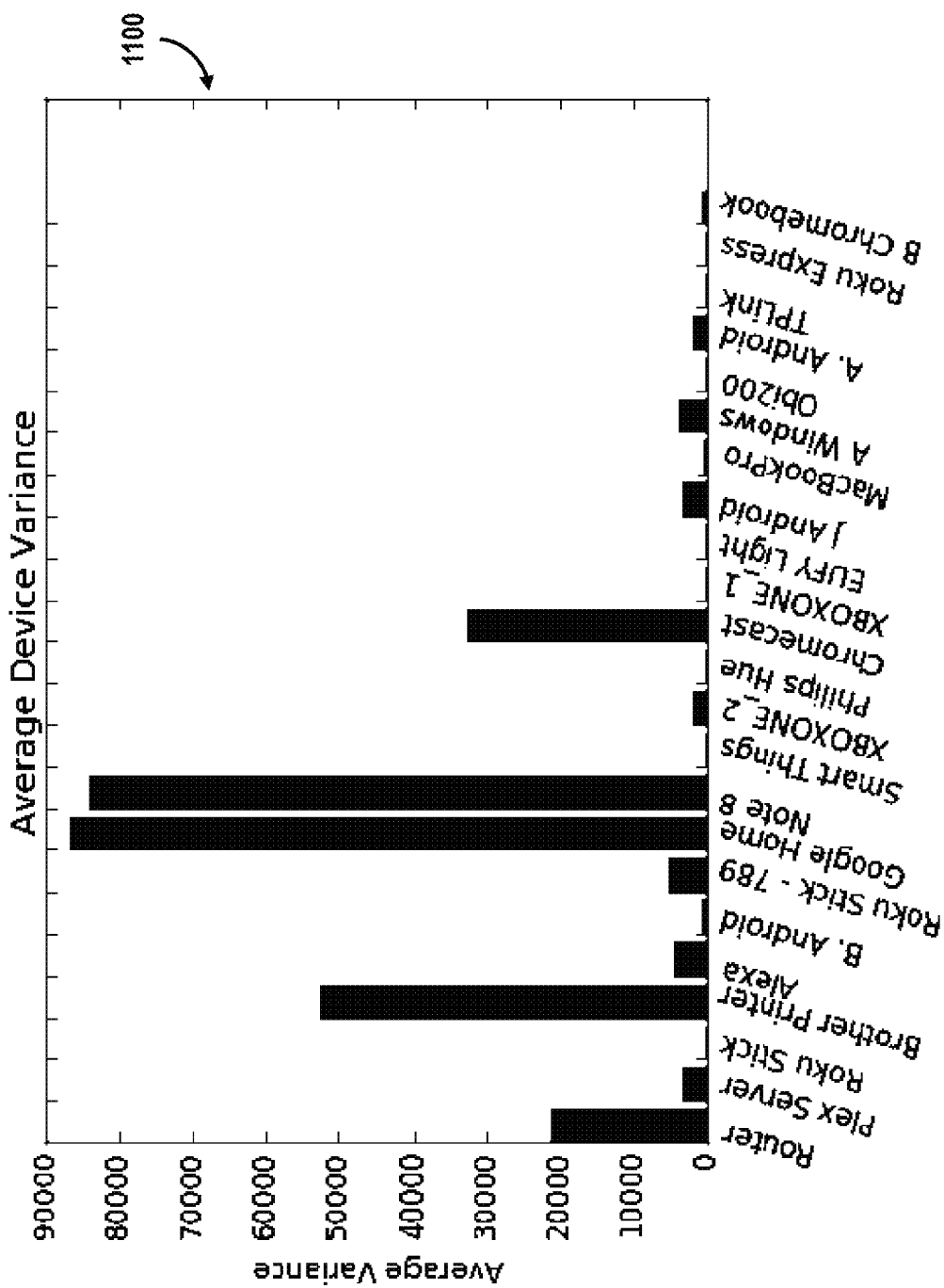
FIG. 11 is a graphical illustration depicting an exemplary plot of average variance per device.

FIG. 11 is a graphical illustration depicting an exemplary plot 1100 of average variance per device. More particularly, plot 1100 demonstrates that the average variance does not necessarily follow the non-normalized network variance of device destinations. From the average device variance metrics, an aggregate complexity for the devices may be obtained.

In an embodiment, the aggregate complexity, or overall device complexity, is the sum of the average device variance and the average device IP complexity. The Aggregate Device Complexity $AD_C$ may then be calculated according to:

$$AD_C = w_{ip} d_{ip} + w_v d_v \qquad \text{(Eq. 8)}$$

where $d_{ip}$ is again the device IP complexity, $d_v$ the device variance, $w_{ip}$ the weight of IP complexity, and $w_v$ the weight of variance. Eq. 8 is thus similar to Eq. 4, above, except that the aggregate device complexity of Eq. 8 utilizes the average device variance. In this implementation, the initial weights for $w_{ip}$ and $w_v$ were set to a value of 1. The aggregate device complexity for the selected group of devices is described further below with respect to FIG. 12.

Figure 12:
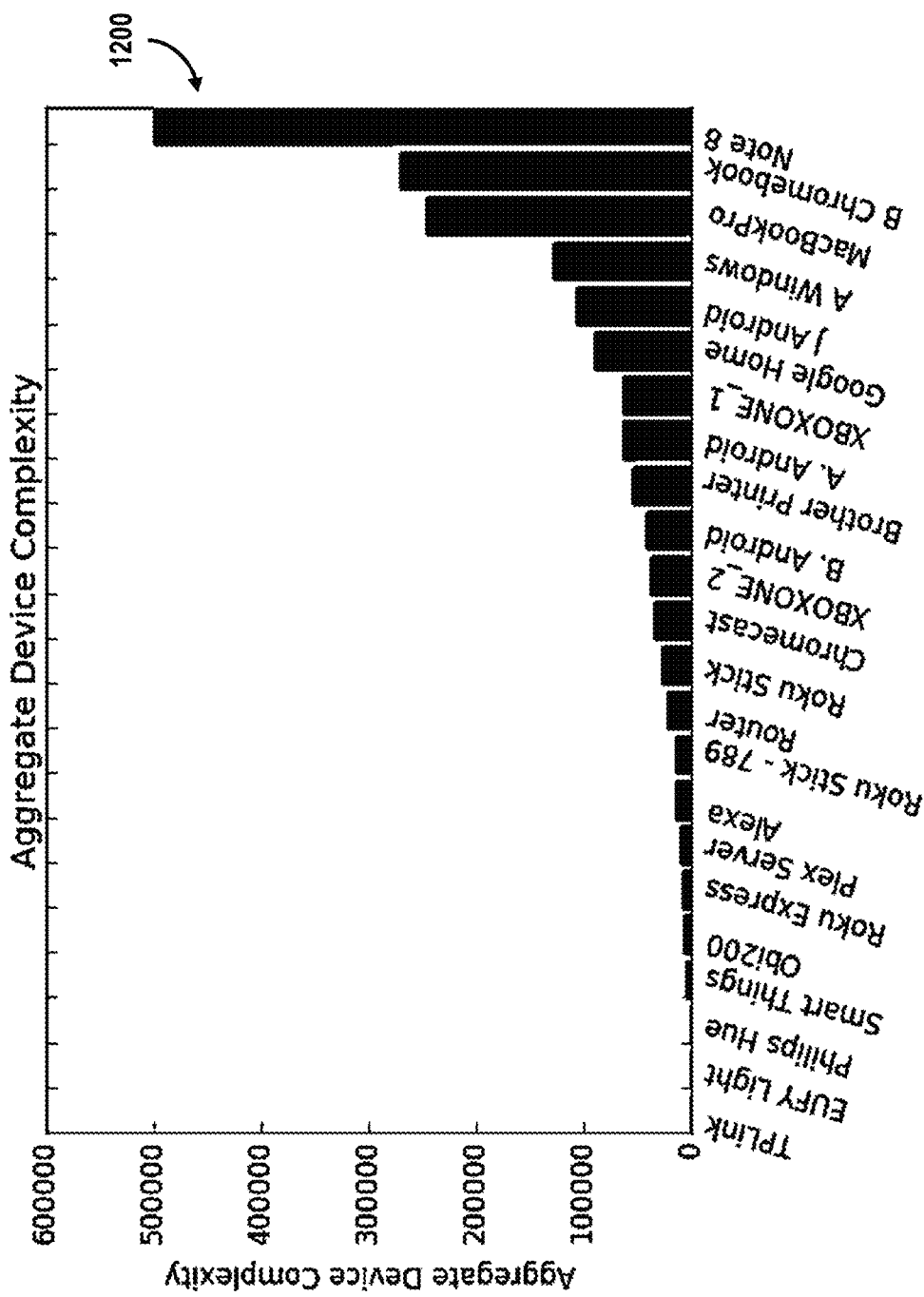
FIG. 12 is a graphical illustration depicting an exemplary plot of aggregate device complexity.

FIG. 12 is a graphical illustration depicting an exemplary plot 1200 of aggregate device complexity. Plot 1200 is configured to arrange the results in the order of the calculated aggregate device complexity, which is useful for easy observation of which type of devices exhibit the highest aggregate complexity.

In comparison, the Discrete Device Complexity $DD_C$ is derived from the Aggregate Device Complexity $AD_C$, and is useful to inform other calculations, such as the hyperparameter of contamination for the isolation forest algorithm, below, by organizing the devices into discrete groups. To group the devices based on their overall complexity, as illustrated below with respect to Table 2, the following equation may be used:

$$DD_C = \lceil \log_{10} AD_C \rceil \quad \text{(Eq. 9)}$$

TABLE 2

| Device | Device Complexity | Discrete Complexity |
|---|---|---|
| TP-Link | 3 | $\lceil \log_{10} 3 \rceil = 1$ |
| Eufy Bulb | 22 | $\lceil \log_{10} 22 \rceil = 2$ |
| Hue | 194 | $\lceil \log_{10} 194 \rceil = 3$ |
| Smart Thing | 3094 | $\lceil \log_{10} 3094 \rceil = 4$ |
| Obi200 | 5494 | $\lceil \log_{10} 5494 \rceil = 4$ |
| Alexa | 13605 | $\lceil \log_{10} 13605 \rceil = 5$ |
| Google Home | 88944 | $\lceil \log_{10} 88944 \rceil = 5$ |
| Roku | 12324 | $\lceil \log_{10} 12324 \rceil = 5$ |
| XBOXONE 1 | 63758 | $\lceil \log_{10} 63758 \rceil = 5$ |
| B.Chromebook | 270287 | $\lceil \log_{10} 270287 \rceil = 6$ |
| MacBook | 342562 | $\lceil \log_{10} 342562 \rceil = 6$ |
| Note 8 | 500262 | $\lceil \log_{10} 500262 \rceil = 6$ |

Figure 13:
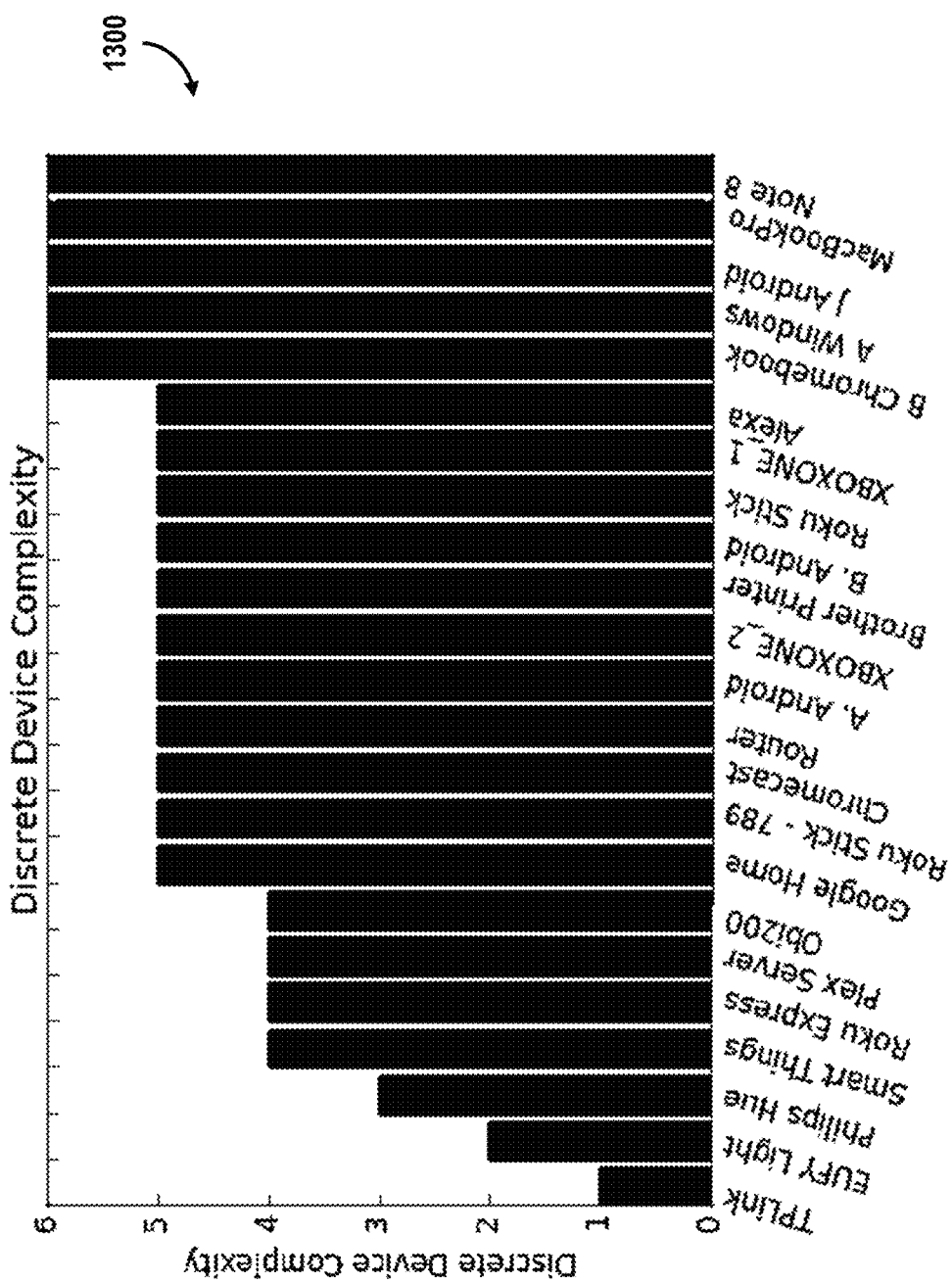
FIG. 13 is a graphical illustration depicting an exemplary plot of discrete device complexity.

FIG. 13 is a graphical illustration depicting an exemplary plot 1300 of discrete device complexity. More particularly, plot 1300 charts the information listed above for the selected devices of Table 2, and includes many more of the devices 506 measured by architecture 500.

Device Behavior

As used herein, the behavior of an IoT device considers only the network traffic that is sent and received by the particular device on the network. This network traffic may then be collated into network flows, where each flow is a sequence of packets where either the source or the destination is the IoT device. In the exemplary embodiment, behavior is based on the historical record of a device's flows on the network. This historical record enables the establishment of a behavioral footprint based on the device's past actions on the network, and this footprint is then useful to determine if the current network state for the device fits within the discovered boundary of such past actions. In some embodiments, behavior may be based on the ratio of anomalous flows to the total number of flows.

In an exemplary embodiment, a measured device anomaly average may be used to calculate a device anomaly score $d_a$. That is, the device anomaly score $d_a$ is based on the average of the flow anomaly scores of the device, represented as:

$$d_a = \frac{\sum_{n=0}^{\infty} fa_n}{n} \quad \text{(Eq. 10)}$$

where $fa$ is the flow anomaly and $n$ is the number of flows.

In an embodiment, the anomaly scores are determined using the isolation forest method, in which each flow from the device's history may be analyzed. That is, the isolation forest anomaly algorithm may be used to derive the behavioral metric for the device.

The isolation forest is a tree ensemble process that builds decision trees based on a random partition of the feature space. The tree's path length is inversely proportional to the abnormality of the observation, that is, the shorter the path to divide the observation space from other observations, the more anomalous is the observation. The isolation forest is somewhat unique among outlier detection techniques in that it explicitly measures the abnormality of the observations rather than attempting to profile the normal data points, which may be significant in how the behavioral boundary for the device is calculated.

This is important in how we calculate the behavior boundary for a device. The isolation forest may be calculated according to:

$$s(x, n) = 2^{-\frac{E(h(x))}{c(n)}} \quad \text{(Eq. 11)}$$

where $h(x)$ is the path length of observation, and $c(n)$ is the average path of an unsuccessful search.

The isolation forest further lends itself to good performance on low-end hardware. The total number of nodes of an isolation tree is $2n-1$. Thus the tree and its required memory grows linearly with n. Additionally, because the isolation forest search is for the shortest path, the algorithm does not need to spend processing time or memory searching observations with the longer path trees.

In some embodiments, the device complexity may be used to tune the behavior. In an exemplary embodiment, a contamination parameter specifies the percentage of observations that are believed to be outliers for training. To properly tune the isolation forest, the calculated complexity value $DD_C$ was used for each device to set the contamination parameter. For low complexity devices, the parameter was set to nearly zero, whereas for high complexity devices the parameter value was closer to 0.5. In some instances, it may be desirable to set a narrow boundary on the decision function for lower-complexity devices, and a broader boundary on the decision function for higher-complexity devices that are more general purpose. Through this advantageous technique, the potential false positive rate of anomalies was greatly reduced on a per-device basis.

In exemplary operation, the behavioral boundary for the devices was calculated over a window of network traffic from the device in the past, as described above, and which is referred to hereinafter as the device learning period $D_{LP}$. The $D_{LP}$ is expected to capture the device's initial joining to the network, as well as a period of normal use. A device behavioral boundary $D_B$ may then be calculated over the $D_{LP}$, and which may include the cardinal set of all unique flows from a device having a path length less than the average path length, which constitutes an average of all the path lengths for the data set. This cardinal set of unique flows is hereinafter referred to as the significant flows. Thus, for the present systems and methods, a significant flow is defined herein as a flow that is marked as an outlier by the isolation forest algorithm during the learning period $D_{LP}$, meaning that the significant flow has a shorter than average path length.

A comparison of significant flows with the total flows is illustrated below with respect to Table 3, which further straits the device behavior boundary.

TABLE 3

| Device | Total Flows | Significant Flows | Percent |
|---|---|---|---|
| TP-Link | 8375 | 1 | 0.012% |
| Eufy Bulb | 4536 | 191 | 2.22% |
| Smart Things | 117376 | 756 | 0.64% |
| Google Home | 838784 | 1714 | 0.44% |
| Alexa | 199489 | 1810 | 0.9% |
| MacBook Pro | 1545311 | 2751 | 0.18% |
| Samsung Note | 199767 | 1921 | 0.96% |

As can be seen in Table 3 only about 1% of flows need to be stored to capture all unique significant flows. The behavioral boundary is thus defined as the set of all unique significant flows, the path length of each significant flow, and the average path length of the forest for each device measured during the learning period. In this example, the anomaly scores of flows may include averages, and stored on a per-device basis.

Device Confidence Calculation

As used herein, device confidence is a probabilistic score of the behavior (i.e., anomalous flow ratio) weighted by the derived device identity, both calculated above. From these previous calculations, values for the device confidence score $D_C$ may also be calculated based on the learned device behavior. In an embodiment, the flows are gathered over training window, and the isolation forest is implemented to determine outlier rank of each device flow. In an exemplary real-world operation, the top 2% of maximum anomaly flows were saved, namely, the most anomalous flows $\{Anomaly_{TOP}\}$. The device behavior is thus the boundary represented by these top outliers.

The Device Confidence may then be defined as the conformity of a device's behavior over time, combined with its learned complexity, and in consideration of the cardinality of the set of top anomalies, which is divided by the derived device complexity, and represented by the following equation:

$$\text{Device Confidence} = \frac{|Anomaly_{TOP}|}{\text{Derived Device Complexity}} \quad \text{(Eq. 12)}$$

The device confidence thus provides a measure of trust that may be had in a device, and which is based on the historical behavior of the device. In an exemplary embodiment, the device confidence is calculated over a validation period $D_{VP}$ that follows the learning period $D_{LP}$. During the validation period $D_{VP}$, any new novel flows (i.e. flows that are new and considered outliers) may be added to the behavior model. The rate of change in the added flows, from the end of the learning period $D_{LP}$ to the end of the validation period $D_{VP}$, thereby becomes the device confidence score $D_C$. Simplified, the device confidence $D_C$ is the rate of change in the cardinal observations for the device over the validation period $D_{VP}$, which may be expressed as:

$$D_C = \frac{1}{\sum^{D_{VP}} f'} \quad \text{(Eq. 13)}$$

where $f'$ represents the new unique flows after initial training.

As described herein, the device confidence may further consider the overall complexity of the device. For example, from the network perspective, a simple device like a light bulb should present a relatively uniform and consistent behavioral footprint in terms of the IP addresses with which it communicates, the number of different ports on which it communicates, and also the traffic sent and received in terms of bytes and packets. In other words, a light bulb is generally expected to have a relatively low variation, a low number of unique IP addresses, and a low number of outliers in the network data it sends and receives. In contrast, a laptop computer on the network is expected to present a significantly different network footprint. Such a general purpose device will likely show a high number of unique IP addresses, a higher variance in the flow data, and a higher number of detected outliers.

All of these metrics provide an actual measure of the complexity of any device on the network, and devices exhibiting a lower complexity enable the establishment of a higher confidence level of their predicted behavior on the network. A high confidence value renders it significantly easier for the system operator to penalize behavior that is outside of the learned range.

In an exemplary embodiment, the confidence scores may be further normalized to values between 1 and −1, where a positive value of 1 represents full confidence and −1 represents negative confidence. Each such device receives a running aggregate score based on its historic data on the network. This aggregate normalized score may then be used as a weight to each flow from the device. In this example, be be preferable to label the device confidence metric as $d_C$, and the. Accordingly, the non-normalized device confidence $d_C$ may be calculated according to:

$$d_C = \frac{w_a d_a}{w_i d_i} \quad \text{(Eq. 14)}$$

whereas the normalized device confidence $D_C$ may be calculated according to:

$$D_C = 2 \frac{d_c - \min d_c}{\max d_c - \min d_c} \quad \text{(Eq. 15)}$$

where $d_C$ is the device confidence, $w_a$ is the weight anomalies modifier, $d_a$ is the device anomalies, $w_i$ is the weight identity modifier, and $d_i$ is the device derived identity.

A sampling of device confidence values for the selected group of devices 506 measured by architecture 500 is illustrated further below in Table 4.

TABLE 4

| Device | Device Confidence |
|---|---|
| TP-Link | 1.0 |
| Philips Hue | 0.952 |

TABLE 4-continued

| Device | Device Confidence |
| --- | --- |
| Obi200 | 0.8548 |
| Google Home | 0.812 |
| Roku | 0.798 |
| B.Chromebook | 0.765 |
| Alexa | 0.746 |
| XBOXONE 1 | 0.698 |
| EUFY Light | 0.566 |
| Smart Things | 0.512 |
| MacBook Pro | 0.383 |
| Amcrest Camera | 0.195 |

As depicted in Table 4, the top value for device confidence is set at 1.0, which represents a zero rate of change during the validation period. As can be seen from Table 4, the device that demonstrated the highest confidence was the TP-Link switch, which exhibited no change in its significant flows from the end of the learning period to the end of the validation period. In contrast, Amcrest Camera demonstrated the lowest device confidence by showing the largest rate of change in significant flows over the validation period.

Flow Score

From the calculations above, the present embodiments are further advantageously capable of calculating a flow confidence score $F_C$, also referred to as a flow trust score $F_T$, for each flow on a residential home network. As used herein, the terms "confidence" and "trust" are used interchangeably for ease of explanation. Nevertheless, in some usages in this field, "confidence" sometimes implies more of an a priori first-hand knowledge, such as in this case where the behavior of a device in the past has actually been observed, and this first-hand knowledge forms the basis of future behavior predictions. "Trust," on the other hand, sometimes is considered to imply more of a third-hand knowledge, such as in the case where knowledge from an outside source forms the basis for future predictions. Such implications though, are not universal in the field, and either or both usages are within the scope of the present embodiment.

Yes they are interchange-able. I prefer confidence as it has a slight connotation that it is based on a-priori Trust to me, implies more third-hand knowledge As used herein, the flow trust score $F_T$ is the numerical score applied to each flow of each device on the network, and may be calculated based on the current anomaly fit and score of the current flow, multiplied by the device confidence score $D_C$, as according to:

$$F_T = \frac{A(\text{fit})D_C}{fa_c fa_a} \quad \text{(Eq. 16)}$$

$$A(\text{fit}) = \begin{cases} 1 & A_c \;\&\&\; A_a > 0 \\ -1 & A_c \| A_a < 0 \end{cases} \quad \text{(Eq. 17)}$$

where $A_c$ represents the isolation fit of connection function, $A_a$ represents the isolation fit of aggregation function, $fa_c$ represents the measured flow anomaly connection score, $fa_a$ represents the measured flow anomaly aggregation score, and $D_C$ is the normalized device confidence calculated above.

In the above calculation, two flow anomaly scores are considered: (i) the flow anomaly connection score $\theta a_c$, which represents is the anomaly of the connection calculated across the tuple of IP headers; and (ii) the measured flow anomaly aggregation score $fa_a$, which represents the anomaly calculated over the aggregate of the flow $fa_a$, namely, the total bytes or total packets.

Accordingly, in an exemplary embodiment, a high trust flow score may be calculated as follows:

$$F_T = \frac{1*0.85}{0.1*0.01} = 850 \quad \text{(Eq. 18)}$$

That is, in this example, $A(f\text{it})=1$ (normal observation), $D_C=0.85$ (high device confidence), $fa_c=0.1$ (normal observation), and $fa_a=0.01$ (normal observation).

In contrast, an exemplary low trust flow score may be similarly calculated, but shown as:

$$F_T = \frac{-.1*0.195}{0.95*0.89} = -0.230 \quad \text{(Eq. 19)}$$

That is, in this low trust flow example, $A(f\text{it})=-1$ (abnormal observation), $D_C=0.195$ (low device confidence), $fa_c=0.95$ (abnormal observation), and $fa_a=0.89$ (abnormal observation).

Thus, in the embodiments described immediately above, the flow trust $F_T$, or flow confidence $F_C$, may be calculated based on the measured network flows. Additionally, alternative flow confidence determinations may be obtained according to the embodiments described further below with respect to FIGS. 14 and 15.

Figure 14:
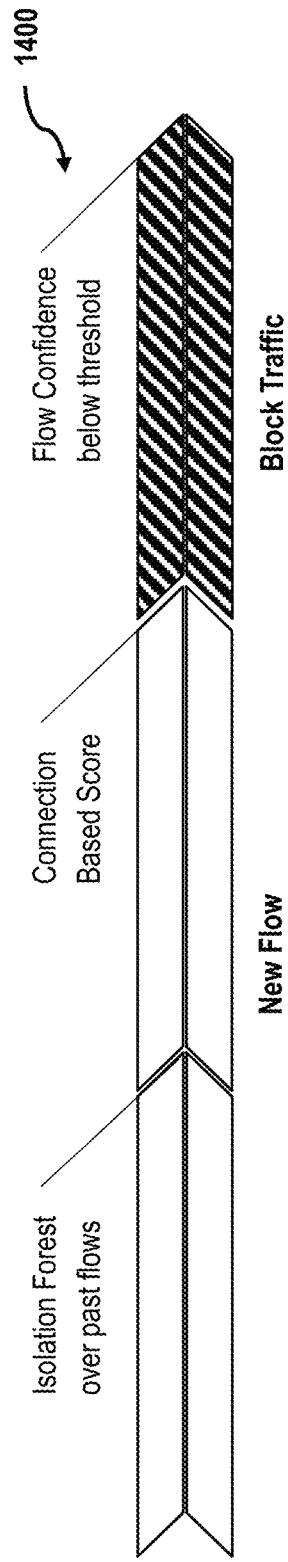
FIG. 14 is a schematic illustration depicting an exemplary flow confidence process.

FIG. 14 is a schematic illustration depicting an exemplary flow confidence process 1400. In an exemplary embodiment, process 1400 may constitute a first step for determining the flow confidence value $F_C$. For example, in a first sub-step, process 1400 implements and isolation forest over past flows, as described above (e.g., over the last window of device flows). In a second sub-step, process 1400 determines a connection-based score for a new flow by calculating the anomaly score for the connection features of the flow (e.g., IPV4 Source/Dest, protocol, port Source/Dest), and multiplying the calculated anomaly by the device confidence score $D_C$. In a third sub-step, process 1400 calculates a value for the flow confidence $F_C$ below a threshold value, and causes the router (e.g., router 502, FIG. 5) to block traffic for the affected flow. In an embodiment, the window implemented for the past flows may be a more recent window than the window used to determine the device confidence.

Accordingly, the flow score with respect to process 1400 may be defined as the score applied to each flow of each device on the network, and which is calculated on the current anomaly fit and score of the current flow multiplied by the normalized device confidence score value $D_C$.

Figure 15:
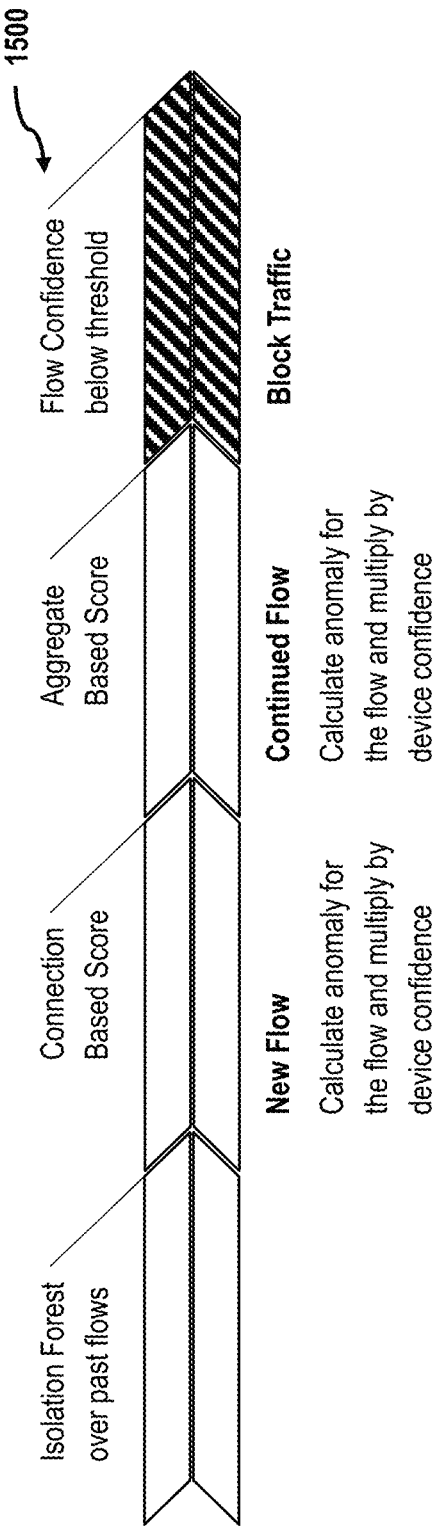
FIG. 15 is a schematic illustration depicting an exemplary aggregate flow confidence process.

FIG. 15 is a schematic illustration depicting an exemplary aggregate flow confidence process 1500. Process 1500 is similar in several respects to process 1400, and includes comparable sub-steps for implementing the isolation forest for past flows, calculating a connection-based score for new flows, and blocking traffic when encountering a flow confidence score below a predetermined threshold value. Process 1500 though further includes an additional sub-step for calculating an aggregate-based score for continued flows, namely, a dynamic monitoring technique for network security management beyond the initial connection of a new device and the corresponding new flows thereto. When considered together with process 1400, process 1500 may be seen to advantageously constitute a second step for calculating the flow confidence value $F_C$. In an exemplary embodiment, process 1500 calculates the anomaly scores for aggregate features, such as the packets and bytes sent into and out from the device, and multiplies the scores by the device confidence value $D_C$.

Accordingly, the flow score with respect to process 1500 may be defined as the score applied to each flow of each device on the network, and which is calculated on the current anomaly fit and score of the current flow, plus the sum of past connection and aggregate flow scores, multiplied by the device confidence score $D_C$.

Figure 16:
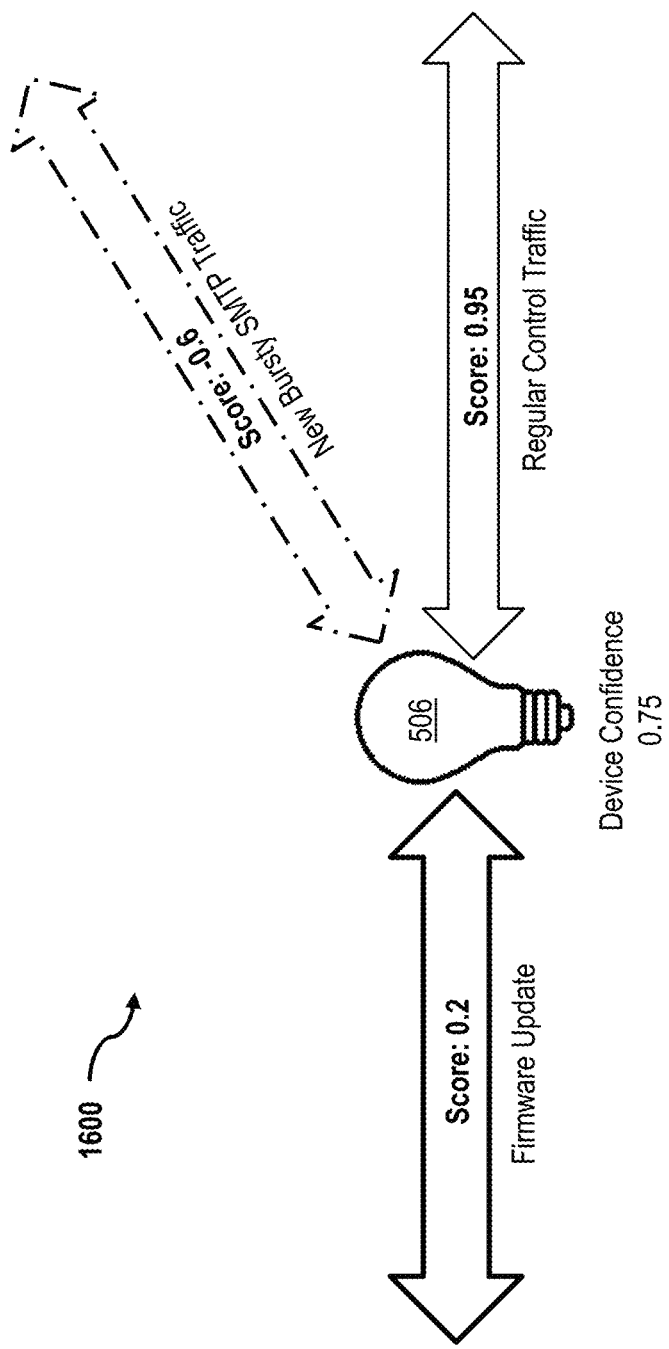
FIG. 16 is a schematic illustration depicting an exemplary flow scoring scheme for the device depicted in FIG. 5.

FIG. 16 is a schematic illustration depicting an exemplary flow scoring scheme 1600 for device 506, FIG. 5. In the exemplary embodiment, router 502 and/or network traffic monitor 508 is/are configured to monitor multiple flows in and out of device 506, including firmware updates, regular control traffic, and new bursty SMTP traffic. Each individual flow is thereby scored according to the calculations described above and multiplied by the device confidence value for device 506.

In another embodiment, the flow anomaly score may be based on the isolation forest technique similar to that described above. In an embodiment, this technique is particularly advantageous, in comparison with other machine learning techniques, for discovering outliers by explicitly identifying anomalous data points rather than determining a profile from normal data points. In an exemplary embodiment, a random forest operates to randomly partition the data space, and the number of the spaces partitioned thereby may be represented by a tree structure such that the number of partitions is equivalent to the path from the tree root to the tree leaf. This path length thus represents the measure of normality in the decision function. In some embodiments, this technique is particularly useful because the anomalies are more prone to being isolated from the rest of the data, and therefore will exhibit shorter paths.

In an embodiment, the contamination parameter may be used in the isolation forest to define the decision function by setting a percentage of outliers in the dataset. In the exemplary embodiment, the value of this contamination parameter may range between 0.0 and 0.5, and which may be obtained by iteratively running an isolation forest on each device, and then varying the contamination linearly from 0.01-0.5. Such an iterative search algorithm may then end when the algorithm finds the ground truth, or when contamination value reaches 0.5. Once the contamination value is determined or calculated for particular device, the number of outliers for that device may be recorded.

In this embodiment, there are two flow anomaly scores considered: (i) the flow connection anomaly $FA_C$, which is the anomaly of the connection calculated across the tuple of IP headers; and (ii) the flow aggregation anomaly $FA_A$, which is the anomaly calculated over the aggregate of the flows, i.e., the total bytes or total packets. In an exemplary embodiment, the average flow anomaly connection $FA_C$ may be calculated according to:

$$FA_C = \sum_{p}^{p-win} fa_{c_{scores}} \quad \text{(Eq. 20)}$$

where $fa_{c_{scores}}$ represents the number of flow anomalies greater than a selected $fa_{c_{threshold}}$. Similarly, the average flow anomaly aggregate $FA_A$ may be calculated according to:

$$FA_A = \sum_{p}^{p-win} fa_{a_{scores}} \quad \text{(Eq. 21)}$$

where $fa_{a_{scores}}$ represents the number of flow anomalies greater than a selected $fa_{a_{threshold}}$.

Figure 17:
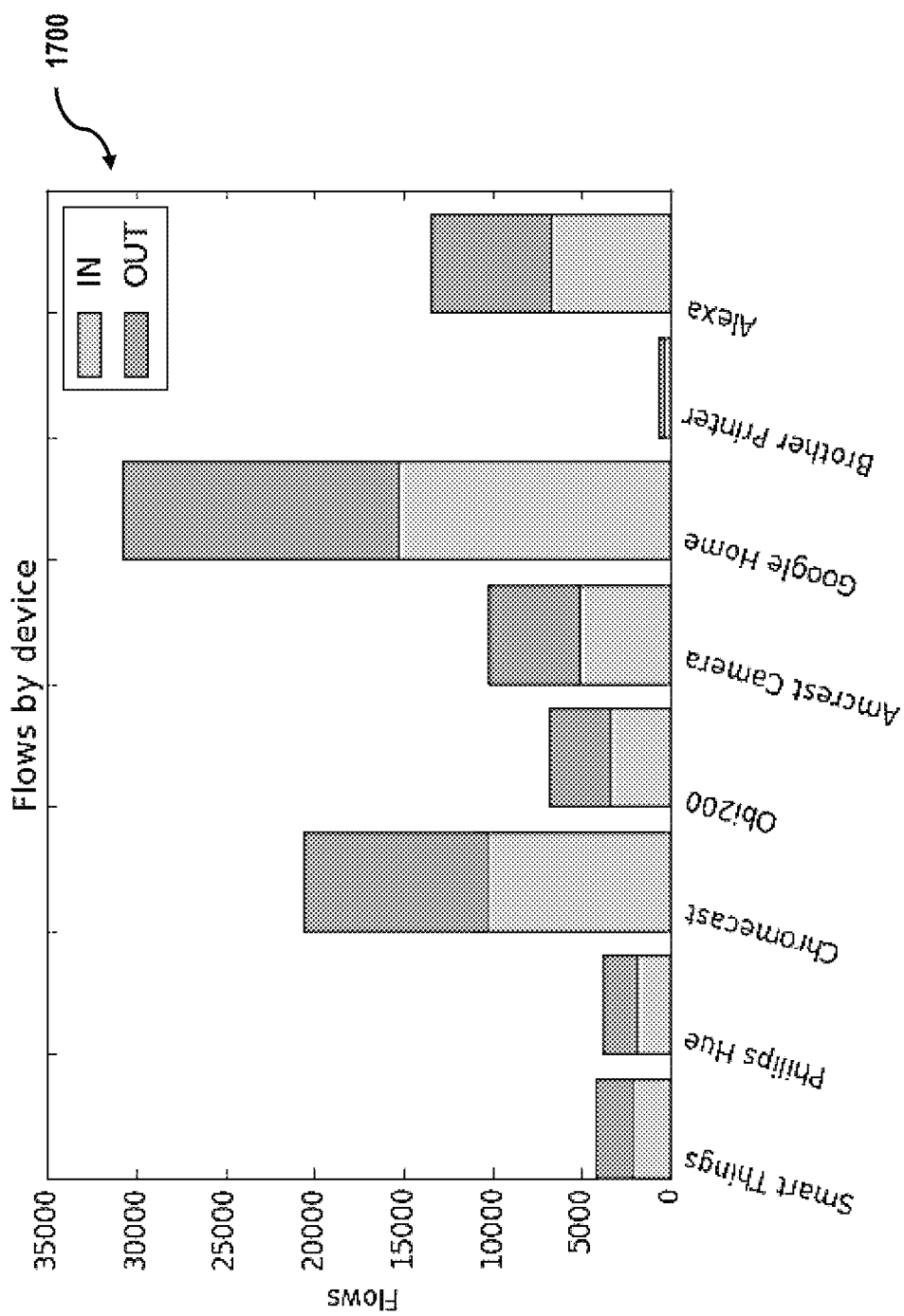
FIG. 17 is a graphical illustration depicting an exemplary plot of total flows per device.

FIG. 17 is a graphical illustration depicting an exemplary plot 1700 of total flows per device. More particularly, plot 1700 illustrates the number of flows in and out of selected devices 506, FIG. 5, for the test systems analyzed calculated above. As can be seen from plot 1700, some devices 506 demonstrate significantly more flows than others, from which the flow anomalies may be determined.

Figure 18:
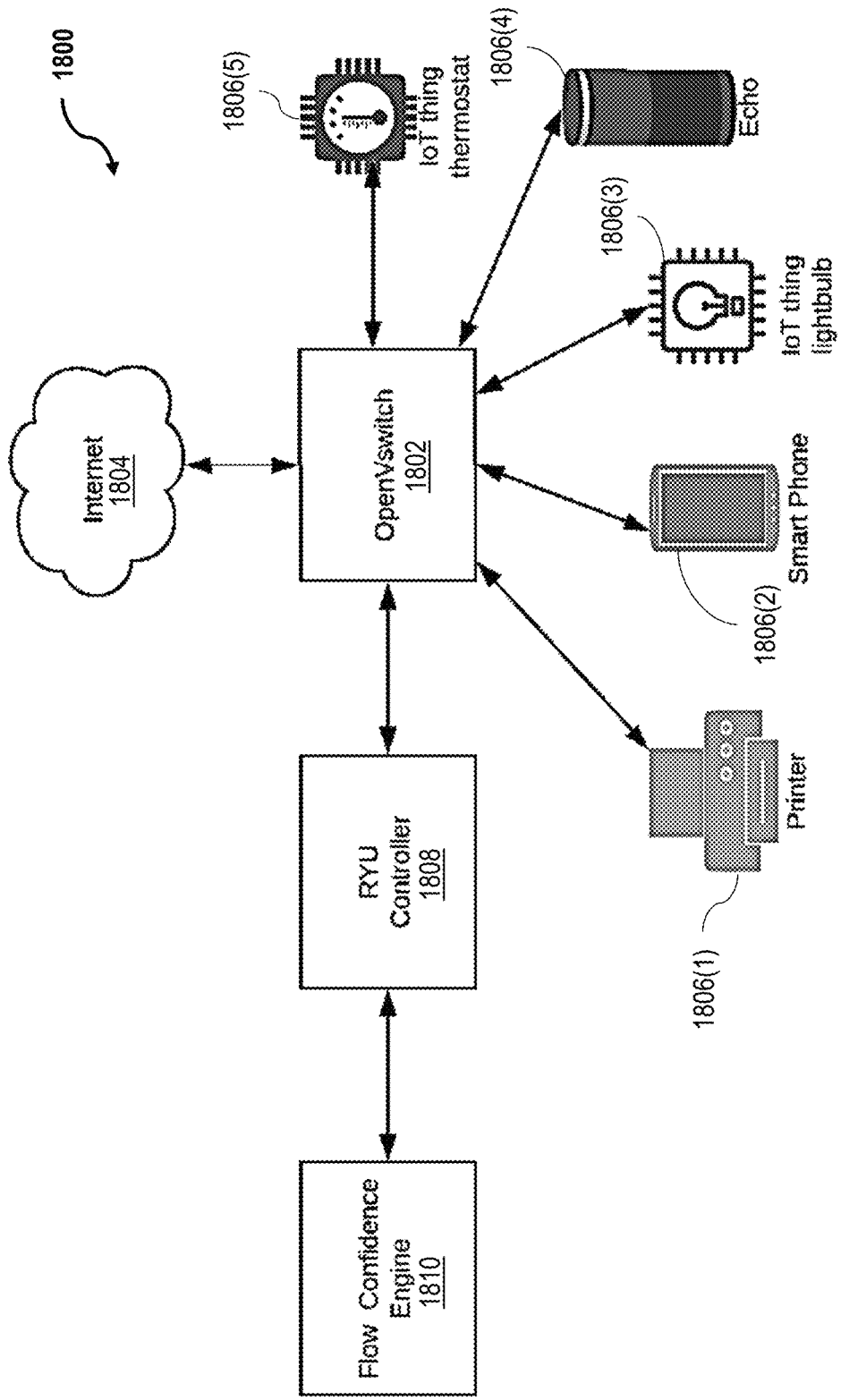
FIG. 18 is a schematic illustration of an exemplary enforcement architecture.

FIG. 18 is a schematic illustration of an exemplary enforcement architecture 1800. Architecture 1800 is similar, in some respects to architecture 500, FIG. 5, and includes a central processor 1802 in operable communication with Internet 1804, one or more IoT devices 1806, and a controller 1808. In this embodiment, controller 1808 is further in communication with a flow confidence/flow trust engine 1810. Architecture 1800 differs from architecture 500 in that central processor 1802 is in operable communication with controller 1808 (i.e., and thus indirectly with flow confidence engine 1810), whereas router 502 was in operable communication with network traffic monitor 508. These architectural configurations are provided by way of example, and not in a limiting sense. The person of ordinary skill in the art will understand that elements of one such architectural configuration are not necessarily exclusive from the other.

In the exemplary embodiment, architecture 1800 represents a ComplexIoT architecture based on a centralized model, and central processor 1802 may be a single device (or multiple devices) that functions as a router, gateway, and AP. As used herein, "ComplexIoT" refers to a system for autonomously measuring and classifying devices based on their network complexity and variance. In a practical implementation to test this model, a low power x86 computer running Kali Linux was used for central processor 1802, and included 4 GB RAM, an Intel processor, and a Broadcom wireless chipset. In the practical implementation, central processor 1802 further utilized an OpenFlow reference soft switch known as OpenVswitch, which supported OpenFlow versions 1.0-1.5.

In this description, "OpenFlow" refers to the open specification for SDN led by the Open Networking Foundation (ONF), and the SDN functions to decouple the control and the data plane in routers and switches, thereby advantageously opening the network to new services, features, and a level of dynamism that is not realized by conventional techniques and architectures. Under this configuration, architecture 1800 further advantageously leverages these programmable capabilities of the network to dynamically allow, block, rate-limit and route traffic based on the confidence score of the flow, as according to one or more of the embodiments described above. In this practical implementation of architecture 1800, controller 1808 was a Ryu OpenFlow controller, i.e., an SDN controller configured to implement OpenFlow, and which functioned to both setup and control the OpenVswitch of processor 1802 in cooperation with a flow collector (e.g., a Raspberry Pi with an installed nProbe storing in a MariaDB relational database), similar to architecture 500, FIG. 5.

In exemplary operation of architecture 1800, flow confidence engine 1810 analyzed the past device flows for the plurality of devices 1806, and then calculated the device complexity(ies), behavioral boundary(ies), device confidence(s), and flow scores thereof. Flow confidence engine 1810 then sent the calculated flow score information to Ryu/SDN controller 1808. Controller 1808 was thus enabled to utilize the received flow scores to add, remove, and/or modify flow rules based on the confidence score(s) calculated according to the algorithms described above. In further operation, controller 1808 was additionally enabled to push the flow rules to OpenVswitch flow tables of central processor 1802. Device confidence scores, which were also calculated according to the innovative algorithms and techniques described above, further enabled controller 1808 to determine, for each device 1806, if new flows should be allowed, rate limited, or dropped.

As illustrated in FIG. 18, the exemplary configuration of architecture 1800 advantageously enables an IoT network to make significantly granular flow decisions on every flow in the network, including inbound/outbound traffic to the Internet as well as intra-network device traffic. Conventional networks and techniques are unable to realize such granularity in flow decisions. The present systems and methods are still further advantageous over conventional techniques in that, based on the behavioral boundary determinations, described above, when a low trust/untrusted flow is encountered, a system according to architecture 1800 is enabled to isolate only the flow that is not trusted instead of isolating the entire device. That is, according to the innovative embodiments described herein, a potentially compromised device may still operate on the network and/or with the Internet to the extent that some flows to and from the device exhibit high trust scores, while isolating, blocking, or limiting those flows exhibiting low trust scores.

In an exemplary embodiment, enforcement is achieved through architecture 1800 by training the confidence model based on aggregate flow data into stages: (i) a connection stage; and (ii) an aggregation stage. In the connection stage of architecture 1800, features of the confidence model are examined that are known at the time of connection. In an exemplary embodiment, the connection stage is run only once at flow connection setup, and connection features thereof may include IP header attributes such as the IP source, IP destination, port, and/or protocol. In the case where the model may detect an outlier based on the connection features, the confidence model may use current device confidence scores, as well as an outlier degree to the flow, to calculate the flow confidence/trust score.

In the aggregation stage of architecture 1800, flow aggregate information is gathered, including one or more of flow bytes, incoming flow packets, outgoing flow bytes, and outgoing flow packets. In an exemplary embodiment, the aggregation stage may be run continuously while a flow is active, and may compare the trained model to a current flow. If the current flow is detected as an aggregate outlier, the model may be configured to utilize the current device confidence score and the outlier degree to calculate a new flow confidence/trust score.

Bootstrapping

In the exemplary embodiment, when a device 1806 is added to the network, architecture 1800 may be configured to begin a learning period, utilizing an initial neutral device confidence $D_C$=1.0. Additionally, until a sufficient behavioral record can be established, all flows from the device may then be assumed to be neutral flow trust $F_T$. Alternatively, initial device confidence may be established through one or more other techniques. For example, the device may present a valid certificate and a query of a vulnerability database, such as common vulnerabilities and exposures (CVE). The person of ordinary skill the art will understand that these examples for establishing an initial device confidence value are provided by way of illustration, and not in a limiting sense. In these examples, for ease of explanation, MAC addresses are assumed to be immutable and to form the root of identity for a device. The scope of the present embodiments, however, is not limited to these assumptions.

Model Validation

In further exemplary operation, the confidence model was validated in several steps. For example, in an initial step, network functionality was verified by first verifying that each flow within architecture is assigned a confidence score. In a second step, a quantitative review of the confidence score is assessed to assure that the model is correctly calculating the score based on the history of the device. That is, the confidence scores may be objectively assessed to determine whether the score(s) is(are) logical for that particular device. In some embodiments, this second step may further include a subjective assessment to evaluate whether the confidence score matches a predetermined threshold for what is expected of the particular device. For example, a device with a low complexity and a high device anomaly average may be initially expected have a low confidence score. This exemplary implementation advantageously enabled the model to resolve any discrepancies between the quantitative and subjective assessments of the several devices, and then perform any desired modifications to account for such discrepancies.

In a practical implementation of the confidence model, the model was validated using the Raspberry Pi flow collector to simulate a device on the network. Once the identity and sufficient behavioral history of the simulated device network was derived by the network, a DDoS attack from the device was simulated to determine the capabilities of the network to adequately respond (e.g., to block the traffic) to the attack from the device using the confidence model techniques an exemplary architectural configurations described herein. These network capabilities were thus validated with respect to some of the following considerations.

As used herein, the phrase "ground truth" represents a measure of algorithm performance. That is, in the case of anomaly detection, the model should include some ground truth to measure how well the algorithm(s) is(are) performing. In an exemplary embodiment, ground truth may be established by: (1) a known and established anomaly in the training data employed to verify that the algorithm is capable of identifying identify that known and established example as an anomaly when encountered; or (2) an artificial example is introduced into the data. For ease of explanation, the following discussion focuses on the latter approach, where artificial examples were injected into the training data of the practical implementation to evaluate the efficacy of the detection algorithms based on the detection of the artificial examples.

The model is further validated in consideration of supervised learning techniques, as opposed to unsupervised learning techniques. More particularly, conventional machine learning techniques generally fall into one of two broad categories: (i) supervised learning, where there is data having a distinct label (e.g., "good" vs. "bad", "cat" vs. "dog", etc.); and (ii) unsupervised learning, where the data has no label, and the algorithm discovers patterns on its own. For ease of explanation, the following description focuses on unsupervised learning techniques. This focus is more illustrative for purposes of this disclosure because, in the unsupervised learning paradigm, there is no set of labeled data that describes the behavior of all IoT devices. That is, in the real world, there will always be new devices and new device firmware making it relatively impossible to have current and accurate labels of behavior for specific device.

The unsupervised learning paradigm is further illustrative because attack vectors are constantly evolving, and there is conventionally no set of labeled data accurately applicable to current and future attacks. An exemplary technique for updating the model, e.g., to be dynamically responsive to evolving attack vectors and device variances, is described further below with respect to FIG. 19.

Figure 19:
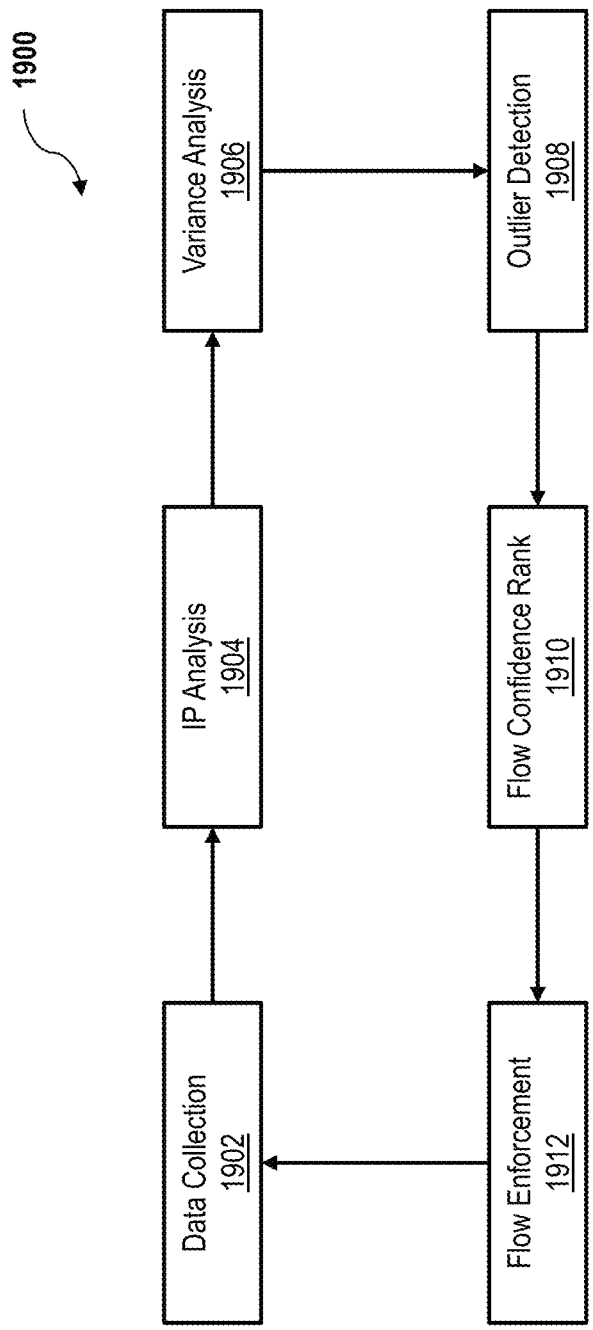
FIG. 19 is a flow diagram depicting a continuous model updating process.

FIG. 19 is a flow diagram depicting a continuous model updating process 1900. In an exemplary embodiment, for the behavioral model to be up to date, dynamic and continuous training over the device history data is desirable. In some embodiments, since it is expected that the recorded device histories will become very large over time, training and testing may be performed across a selected window of past data for each device such that memory and processing resources may be conserved where practicable.

In an embodiment, process 1900 includes a data collection step 1902, an IP analysis step 1904, a variance analysis step 1906, an outlier detection step 1908, a flow confidence rank step 1910, and a flow enforcement step 1912. In an exemplary embodiment, individual steps of process 1900 are performed in the order depicted in FIG. 19, and according to one or more of the particular algorithms and techniques described above with respect to each individual sub-process for the individual step labeled the same. In some embodiments though, the steps may be performed in a different order, or two or more steps may be performed simultaneously, except where specifically described to the contrary. Additionally, in some instances, the model may be updated with fewer steps, or using additional steps that are not depicted in FIG. 19. In an exemplary embodiment, data collection step 1902 is performed "first" at startup, but this designation may be considered insignificant during the continuous operation of process 1900, and particularly when the steps of process 1900 are executed in a loop, as shown.

In some embodiments, the behavior model is particularly capable of quickly ranking less complex devices, whereas in the case of more complex devices (e.g., laptop computers), it may be desirable to devote additional resources for the analysis thereof. For example, the modeling techniques described herein learn the behavioral pattern of a device and detect changes in that pattern. Accordingly, defining the behavioral boundary for less complex devices is relatively straightforward, since such devices generally demonstrate low variance in terms of network traffic, thereby simplifying the modeling of such devices. In contrast, complex devices generally demonstrate a high variance, are therefore more difficult to model. In particular, media streaming devices, for example, often require different consideration because such devices demonstrate relatively high variance due to their high bandwidth usage when in use, but low bandwidth usage when such devices are idle.

For ease of explanation, the modeling techniques described herein assume a particular a priori trust of devices directly from the supply chain. That is, the model may be simplified to assume that devices are not treated as malicious at the time of installation. However, the algorithms and modeling techniques described above are sufficiently versatile to treat some devices as less trustworthy at the beginning of the model, and adjust the confidence score of such devices over time according to the behavioral model and updates thereto. For example, in some instances, a device having pre-installed malware may join the network, which may taint the derived identity determination and learned behavior. In such cases, the algorithms described herein will be unlikely to establish a device confidence score in as quickly and reliably a fashion as for other devices.

In some instances, such as in the case of MAC address spoofing, the confidence model may be further configured to reset upon encountering MAC address spoofing. It is not in the art that MAC addresses are rather easily spoofed, and the present systems and methods may advantageously demote the device confidence score of a device that changes MAC addresses. In an exemplary embodiment, the present confidence model may further implement a clock skew+MAC technique to address this challenge.

The modeling techniques described herein still further advantageously enable the present systems and methods granularly process flows in devices such that the network need not automatically act on false positives, or alternatively, may quickly reestablish flows if a false positive leads to an undesired blocked flow. That is, the dynamic modeling techniques of the present embodiments are particularly effective, in comparison with conventional techniques, at rejecting false positives, and also at reducing the likelihood of false positives through use of the device history and complexity in the modeling algorithms. The fine-grained network control realized according to the present systems and methods further enables an operator to further carefully tune the model and algorithms to avoid interference with critical devices.

In an embodiment, the present modeling techniques are sufficiently versatile such that the required training time may be adjusted depending on the window of training history that is selected. For example, whereas the flow header may be assessed almost instantly, aggregates flows may require more time for sufficient evaluation. The present techniques are therefore advantageously adjustable to enable a trade-off to maximize efficiency for the particular devices and flows encountered by the network. In an exemplary embodiment, the behavioral and confidence models herein may operate such that the flow management is relatively unobtrusive to the end-user, yet still allow intervention if the behavioral model is to be modified to accommodate new post-training flows.

The examination of data over long periods of time remains a significant challenge to most machine learning algorithms. For example, as an IoT device interacts with the network, the dataset for that IoT device will grow. Such dataset growth often becomes a limiting factor as the resources become overwhelmed to store, ingest, and process the data in meaningful ways. The present modeling techniques overcome these challenges through innovative techniques for storing behavioral results of the device using fewer resources, but in ways that continue to add to the device profile.

In some embodiments, the present systems and methods significantly reduce the device history data footprint using a coresets. As used herein, "coresets" refer to the subsets of the original data that, when used as a training source for a machine learning algorithm, are statically competitive to an algorithm trained over the entire set. In other embodiments, anomaly examples may be directly stored, such that anomalies that are detected having an anomaly score above a particular threshold may be retained for longer terms. In some instances, these stored anomaly examples may be fed back into the respective algorithm, and/or used as a check to determine if the latest outliers are short term outliers, as opposed to long term outliers. These data footprint reduction techniques may be implemented individually, or together.

Additional footprint reduction within the scope of the present embodiments include, without limitation, aggregation of variance, IP spread, and/or IP depth metrics, which may be additionally, or alternatively, incorporated into the overall calculation of flow and device confidence.

A comparison of architecture 500, FIG. 5, with architecture 1800, FIG. 18, demonstrates the efficacy of the present modeling techniques for both the home environment use case in the lab environment use case. That is, the home environment refers to the use case where users are living and interacting with the network and IoT devices in a setting such as a home residence. In comparison, in the lab environment use case, the IoT devices are substantially idle. The description herein thus demonstrates, through a comparison of the two environments, a useful baseline behavior of a number of IoT devices, and also how human interaction may change this baseline.

Figure 20:
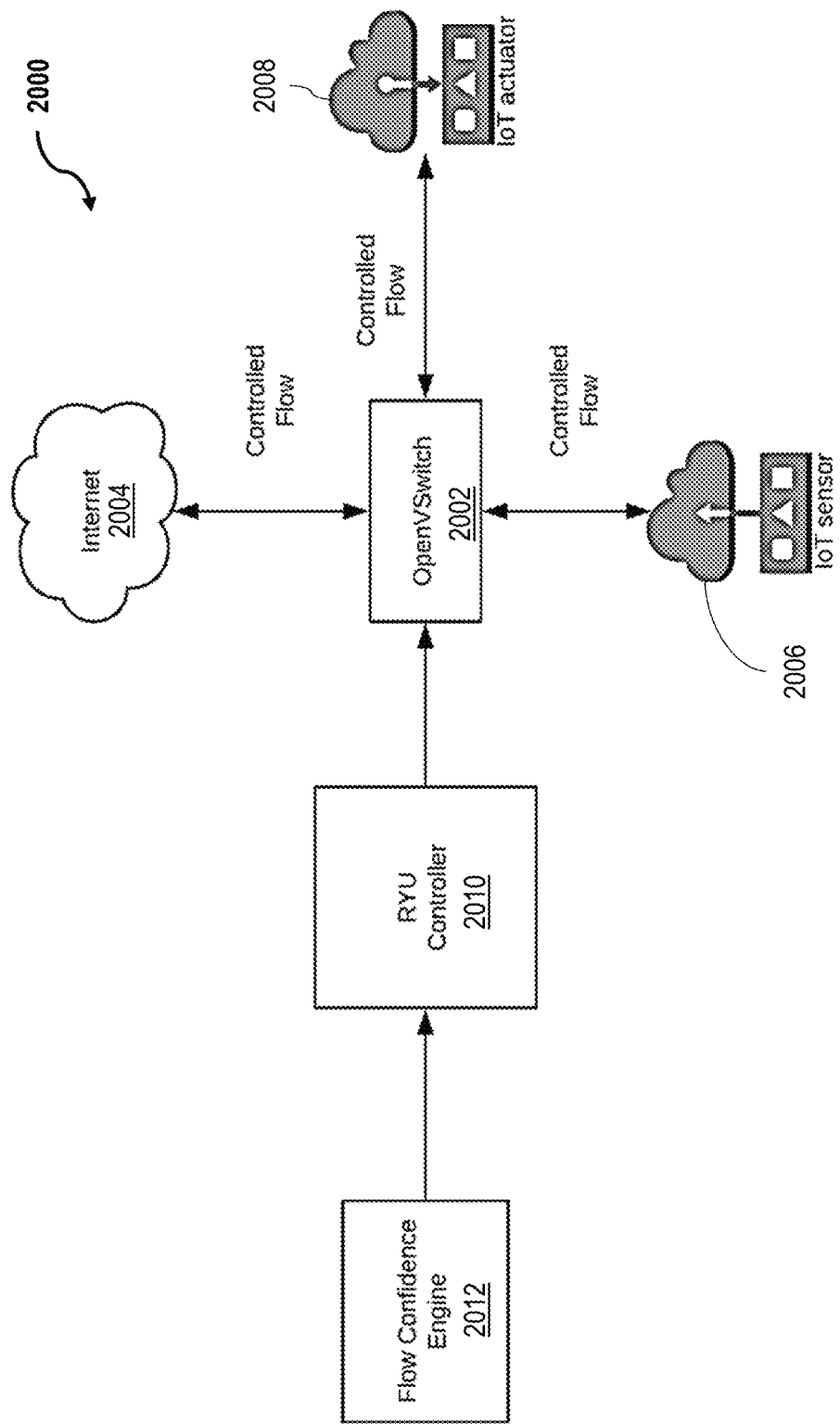
FIG. 20 is a schematic illustration of an alternative data collection architecture.

FIG. 20 is a schematic illustration of an alternative data collection architecture 2000. Architecture 2000 is substantially similar to architecture 1800, FIG. 18, and includes a central processor 2002 in operable communication with Internet 2004, an IoT sensor 2006, an IoT actuator 2008, and a controller 2010 in communication with a flow confidence/flow trust engine 2012. Architecture 2000 differs from architecture 1800 in that central processor 2002 operates with respect to IoT sensor 2006 and IoT actuator 2008, as opposed to a plurality of various IoT devices. In the exemplary embodiment, central processor 2002 is an OpenVswitch supporting OpenFlow versions 1.0-1.5, controller 2010 is a Ryu OpenFlow controller in cooperation with a Raspberry Pi flow collector with an installed nProbe storing in a MariaDB relational database.

Exemplary operation of architecture 2000 is further substantially similar to that of architecture 1800, in that flow confidence engine 2012 consumes the data from the flow collector of controller 2010 and then functions to run the respective variation analysis and anomaly detection, and then the flow confidence on each flow. In further exemplary operation of architecture 2000, the OpenFlow switch(es) of processor 2002 process the flows in a pipeline fashion. In an exemplary embodiment, the relevant OpenFlow tables thereof may begin at zero, and then proceed sequentially.

The present systems and methods therefore provide innovative techniques for measuring variance in a viable way such that complexity of IoT devices on the network may be effectively determined. The present embodiments further provide new and effective techniques for determining device complexity from the spread of IP addresses communicating with the device. As described herein, innovative anomaly detection algorithms are provided that are useful for single-class support vector machines (SVMs) and isolation forests, and particularly in the case of the residential network. The present systems and methods further effectively utilize these variance, IP Spread, and anomaly detection calculations to accurately describe the derived identity of a device, while also efficiently storing the data relevant to the IoT devices to reduce the data footprint using novel aggregation, compression, and/or optimization techniques.

Accordingly, the present systems and methods provide an innovative ComplexIoT system for autonomously measuring and classifying devices based on their network complexity and variance. The complexity classifications may then be advantageously utilized to to tune the decision function of an anomaly detection algorithm to each device. The behavioral models of the present embodiments further enable the establishment of a behavior boundary for each device based on the tuned anomaly detection, and this behavior boundary may be compressed as a representative set of all the necessary flows needed to completely define the behavior of the device. The behavioral model may then be utilized to establish a reliable confidence rank on each flow, such that the system is enabled to make per-flow access control decisions for each device.

As described above, the innovative techniques of the present embodiments may be implemented with respect to an enforcement architecture that may be effectively scaled in terms of bandwidth and CPU resources. This enforcement architecture thus represents further significant improvements over conventional configurations through the capability to utilize multi-core, arm-based CPU structures, as well as and hardware-based OpenFlow implementations that may be implemented using low-power off-the shelf router hardware for substantial portions of the architecture.

The present embodiments further provide innovative algorithms and processes for classifying IoT devices based on the complexity and variance of the network flows to and from the device, and further how such complexity algorithms may be further utilized to tune a decision function of an isolation forest anomaly detection algorithm for each device. In further embodiments, innovative models are provided for establishing the behavior boundary of normal flows, which then may be used to define a confidence metric for each device using a rate of change in the number of unique significant flows from the model. The systems and methods herein still further provide innovative techniques for using the learned behavioral boundary for each device, and then modify the learned behavioral boundary with a calculated device confidence score to develop a trust score for every flow from each device. All of these techniques are then demonstrated according to an innovative reference architecture useful to render per-flow access control decisions for each device on the network.

Exemplary embodiments of systems and methods for trust evaluation and establishment in a network environment are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A security apparatus for a local network, the apparatus being in communication with an external electronic communication system and a first electronic device, comprising:
   a memory device configured to store computer-executable instructions; and
   a processor in operable communication with the memory device,
   wherein the processor is configured to implement the stored computer-executable instructions to cause the apparatus to:
      determine a complexity score for the first electronic device;
      establish a behavioral pattern for the first electronic device operating within the local network;
      calculate a confidence metric for the first electronic device based on the determined complexity score and the established behavioral pattern; and
      control access of the first electronic device to the external electronic network according to the calculated confidence metric.

2. The apparatus of claim 1, wherein the external electronic communication system is the Internet.

3. The apparatus of claim 1, wherein the first electronic device capable of connecting with the Internet of Things (IoT).

4. The apparatus of claim 1, wherein the apparatus comprises a router.

5. The apparatus of claim 1, wherein the processor is further configured to control access of the first electronic device to the external electronic network by one of routing, limiting, or dropping individual network flows to and/or from the first electronic device.

6. The apparatus of claim 4, wherein the router is in operable communication with a network traffic monitor configured to monitor the individual network flows.

7. The apparatus of claim 6, wherein the processor is further configured to determine the complexity score for the first electronic device according to a derived device complexity calculation based on a one of a variance of the individual network flows and an endpoint analysis of the first electronic device.

8. The apparatus of claim 6, wherein the processor is further configured to determine the complexity score for the first electronic device an aggregated complexity score derived from an analysis of network traffic of the device over time.

9. The apparatus of claim 6, wherein the processor is further configured to establish the behavioral pattern for the first electronic device by generating a probabilistic behavioral model.

10. The apparatus of claim 9, wherein the behavioral model considers only network traffic that is sent and received by the first electronic device on the processor.

11. The apparatus of claim 9, wherein the behavioral model considers a historical record of the individual network flows of the first electronic device on the local network to learn the behavioral pattern of the first device.

12. The apparatus of claim 11, wherein the processor is further configured to learn the behavioral pattern of past actions of the first device on the local network from the historical record of the individual network flows of the first electronic device.

13. The apparatus of claim 12, wherein the processor is further configured to determine that a current network state for the device fits within a discovered boundary of the behavioral pattern of past actions.

14. The apparatus of claim 9, wherein the behavioral model is configured to implement an isolation forest anomaly algorithm to derive a behavioral metric for the first electronic device.

15. The apparatus of claim 6, wherein the processor is further configured to establish the behavioral pattern based on a ratio of anomalous flows of the individual network flows to a total number of the individual network flows.

16. The apparatus of claim 6, wherein the processor is further configured to (i) calculate the confidence metric for the first electronic device, and (ii) rank every individual network flow to and from the device based on the confidence metric.

17. The apparatus of claim 16, wherein the processor is further configured to collate the network traffic into the ranked individual network flows, and wherein each individual network flow comprises a sequence of packets.

18. The apparatus of claim 1, wherein the processor is further configured to tune the established behavioral pattern according to the determined complexity score.

19. The apparatus of claim 1, wherein the apparatus is in operable communication with a second electronic device, different from the first electronic device, and wherein the processor is further configured to control access of the first electronic device to the second electronic device according to the calculated confidence metric.

20. The apparatus of claim 1, wherein the apparatus comprises a network interface in communication with a network control element.

* * * * *